United States Patent [19]
Vasa

[11] Patent Number: 6,157,951
[45] Date of Patent: Dec. 5, 2000

[54] DUAL PRIORITY CHAINS FOR DATA-COMMUNICATION PORTS IN A MULTI-PORT BRIDGE FOR A LOCAL AREA NETWORK

[75] Inventor: Suresh L. Vasa, Cupertino, Calif.

[73] Assignees: Sony Corporation, Tokyo, Japan; Sony Electronics, Inc., Park Ridge, N.J.

[21] Appl. No.: 09/064,806

[22] Filed: Apr. 22, 1998

Related U.S. Application Data

[60] Provisional application No. 60/059,171, Sep. 17, 1997.

[51] Int. Cl.[7] .................................................. G06F 13/00
[52] U.S. Cl. ............................................................. 709/223
[58] Field of Search ........................ 364/DIG. 1, DIG. 2; 709/200, 206, 207, 218, 225, 232, 238, 240, 249, 251

[56] References Cited

U.S. PATENT DOCUMENTS

| | | | |
|---|---|---|---|
| H586 | 2/1989 | Kun ............................................ | 370/94 |
| Re. 33,426 | 11/1990 | Sugimoto et al. .................... | 370/85.14 |
| 3,735,357 | 5/1973 | Maholick et al. .................... | 340/172.5 |
| 4,213,201 | 7/1980 | Gagnier et al. ............................ | 370/62 |
| 4,589,120 | 5/1986 | Mendala .................................. | 375/117 |
| 4,597,078 | 6/1986 | Kempf ..................................... | 370/94 |
| 4,627,052 | 12/1986 | Hoare et al. .............................. | 370/88 |
| 4,706,081 | 11/1987 | Hart et al. .......................... | 340/825.03 |
| 4,707,827 | 11/1987 | Bione et al. .............................. | 370/85 |
| 4,710,769 | 12/1987 | Friedman et al. ................. | 340/825.03 |
| 4,715,030 | 12/1987 | Koch et al. ............................... | 370/85 |
| 4,718,060 | 1/1988 | Oguchi et al. ............................ | 370/85 |
| 4,723,311 | 2/1988 | Moustakas et al. ..................... | 455/612 |
| 4,727,537 | 2/1988 | Nichols .................................... | 370/85 |
| 4,727,538 | 2/1988 | Furchtgott et al. ....................... | 370/85 |
| 4,737,953 | 4/1988 | Koch et al. ............................... | 370/94 |
| 4,744,078 | 5/1988 | Kowalczyk ............................... | 370/85 |
| 4,797,879 | 1/1989 | Habbab et al. ............................. | 370/3 |
| 4,823,338 | 4/1989 | Chan et al. ............................... | 370/85 |
| 4,849,962 | 7/1989 | Morimoto et al. ........................ | 370/29 |

(List continued on next page.)

FOREIGN PATENT DOCUMENTS

| | | | |
|---|---|---|---|
| 0 397 188 A2 | 11/1990 | European Pat. Off. ........ | H04L 12/46 |
| 0597789 A1 | 5/1994 | European Pat. Off. ........ | H04L 12/46 |
| 0 609 626 A2 | 8/1994 | European Pat. Off. ........ | H04L 12/50 |
| 0 642 246 A2 | 3/1995 | European Pat. Off. ........ | H04L 29/06 |
| 0785698 A2 | 7/1997 | European Pat. Off. ....... | H04Q 11/04 |
| WO 96/13922 | 5/1996 | WIPO ........................... | H04L 12/44 |
| WO 96/21302 | 7/1996 | WIPO ........................... | H04L 12/46 |
| WO 97/18657 | 5/1997 | WIPO ........................... | H04L 12/18 |

OTHER PUBLICATIONS

Bob Stewart and Bill Hawe, "Local Area Network Applications," Telecommunications, North American Edition, Sep. 1984, pp. 96f–96j, and 96u.

(List continued on next page.)

*Primary Examiner*—Robert B. Harrell
*Attorney, Agent, or Firm*—Haverstock & Owens LLP

[57] ABSTRACT

A technique for prioritizing accesses to a communication bus by data-communication ports in a multi-port bridge for a local area network. The bridge includes a plurality of ports interconnected by the bus. The bus includes signal lines dedicated to communicating commands, signal lines dedicated to communicating data, and several signal lines having special purposes. For example, two signal lines, are preferably dedicated to initiating different types of access to the bus, each having a respective priority. The ports are of two types (e.g. 100 Mbps or 10 Mbps data rates), each having a respective priority. A bus controller monitors the type of access to the bus attempted and the type of ports attempting access and grants access to the bus according to an appropriate priority. Ports of a like type which attempt a like type of access to the communication bus are granted access to the bus according to an assigned relative order, wherein the assigned relative order repeats and wherein a port last granted access to the communication bus has a lowest priority and a port adjacent in the assigned relative order to the last port granted access to the communication bus has a highest priority and remaining ports have ascending intermediate levels of priority according to the assigned relative order. Logic utilized makes a determination of which port is to be granted access to the bus in the appropriate priority with a minimum of delay.

35 Claims, 15 Drawing Sheets

U.S. PATENT DOCUMENTS

| | | | |
|---|---|---|---|
| 4,878,216 | 10/1989 | Yunoki | 370/60 |
| 4,901,308 | 2/1990 | Deschaine | 370/58.1 |
| 4,905,219 | 2/1990 | Barr et al. | 370/4 |
| 4,933,937 | 6/1990 | Konishi | 370/85.13 |
| 4,935,922 | 6/1990 | Wicklund et al. | 370/60 |
| 5,016,159 | 5/1991 | Maruyama | 364/200 |
| 5,020,052 | 5/1991 | DePrycker et al. | 370/60 |
| 5,027,350 | 6/1991 | Marshall | 370/85.13 |
| 5,048,014 | 9/1991 | Fischer | 370/85.5 |
| 5,107,489 | 4/1992 | Brown et al. | 370/58.2 |
| 5,119,367 | 6/1992 | Kawakatsu et al. | 370/54 |
| 5,140,585 | 8/1992 | Tomikawa | 370/60.1 |
| 5,151,897 | 9/1992 | Suzuki | 370/85.13 |
| 5,151,994 | 9/1992 | Wille et al. | 395/800 |
| 5,166,926 | 11/1992 | Cisneros et al. | 370/60 |
| 5,184,346 | 2/1993 | Kozaki et al. | 370/60 |
| 5,229,993 | 7/1993 | Foudriat et al. | 370/85.3 |
| 5,241,550 | 8/1993 | Kusano | 371/71 |
| 5,243,699 | 9/1993 | Nickolls et al. | 395/275 |
| 5,274,631 | 12/1993 | Bhardwaj | 370/60 |
| 5,307,345 | 4/1994 | Lozowick et al. | 370/61 |
| 5,339,316 | 8/1994 | Diepstraten | 370/85.13 |
| 5,353,353 | 10/1994 | Vijeh et al. | 380/29 |
| 5,379,289 | 1/1995 | DeSouza et al. | 370/85.13 |
| 5,379,296 | 1/1995 | Johnson et al. | 370/60 |
| 5,386,413 | 1/1995 | McAuley et al. | 370/54 |
| 5,404,459 | 4/1995 | Gulick et al. | 395/275 |
| 5,410,754 | 4/1995 | Klotzbach et al. | 370/85.13 |
| 5,430,762 | 7/1995 | Vijeh et al. | 375/211 |
| 5,432,511 | 7/1995 | Sadjadian et al. | 341/61 |
| 5,434,861 | 7/1995 | Pritty et al. | 370/85.8 |
| 5,442,578 | 8/1995 | Hattori | 364/746.1 |
| 5,446,726 | 8/1995 | Rostoker et al. | 370/17 |
| 5,448,565 | 9/1995 | Chang et al. | 370/85.13 |
| 5,457,446 | 10/1995 | Yamamoto | 340/825.24 |
| 5,457,679 | 10/1995 | Eng et al. | 370/16 |
| 5,481,540 | 1/1996 | Huang | 370/85.13 |
| 5,487,067 | 1/1996 | Matsushige | 370/85.7 |
| 5,502,748 | 3/1996 | Wilkinson | 375/354 |
| 5,506,902 | 4/1996 | Kubota | 380/9 |
| 5,515,376 | 5/1996 | Murthy et al. | 370/85.13 |
| 5,521,913 | 5/1996 | Gridley | 370/58.2 |
| 5,522,059 | 5/1996 | Marushima et al. | 395/476 |
| 5,530,434 | 6/1996 | Kanda | 340/825.04 |
| 5,541,923 | 7/1996 | Kato | 370/85.1 |
| 5,550,826 | 8/1996 | Tanaka et al. | 370/85.8 |
| 5,560,038 | 9/1996 | Haddock | 395/800 |
| 5,565,929 | 10/1996 | Tanaka | 348/565 |
| 5,568,476 | 10/1996 | Sherer et al. | 370/60 |
| 5,568,643 | 10/1996 | Tanaka | 395/739 |
| 5,570,330 | 10/1996 | Okawa | 369/44.32 |
| 5,570,466 | 10/1996 | Oechsle | 395/200.15 |
| 5,598,161 | 1/1997 | Yamada | 341/159 |
| 5,598,278 | 1/1997 | Tanaka et al. | 386/96 |
| 5,598,391 | 1/1997 | Mukawa | 369/54 |
| 5,598,581 | 1/1997 | Daines et al. | 395/872 |
| 5,600,664 | 2/1997 | Hayashi | 371/43 |
| 5,602,851 | 2/1997 | Terashita et al. | 370/403 |
| 5,608,730 | 3/1997 | Osakabe et al. | 370/471 |
| 5,608,879 | 3/1997 | Cooke | 395/290 |
| 5,621,725 | 4/1997 | Kawamura et al. | 370/43 |
| 5,640,399 | 6/1997 | Rostoker et al. | 370/392 |
| 5,721,927 | 2/1998 | Baraz et al. | 395/705 |
| 5,761,435 | 6/1998 | Fukuda et al. | 395/200.68 |
| 5,802,047 | 9/1998 | Kinoshita | 370/359 |
| 5,923,654 | 7/1999 | Schnell | 370/390 |
| 5,949,788 | 9/1999 | Friedman et al. | 370/431 |
| 6,018,526 | 1/2000 | Liu et al. | 370/401 |

OTHER PUBLICATIONS

Bob Stewart and Bill Hawe, and Alan Kirby, "Local Area Network Connection," Telecommunications, North American Edition, Sep. 1984, pp. 54–55,58–59 and 66.

National Semiconductor, databook, "DP83934 SONIC™–T Systems–Oriented Network Interface Controller with Twisted Pair Interface" pp. 1–457 to 1–458, 1–468 to 1–477, 1–480, 1–512, 1–527– to 1–529.

NEC Data Sheet, MOS Integrated Circuit μPD4516421, 4516821, 4516161 16M–bit Synchronous DRAM, Nov. 1995.

Printout of internet website http://www.ti.com/sc/docs/network/tswitch/product.htm#3150al, ThunderSWITCH Product Information, "ThunderSWITCH Product Descriptions," Feb. 1997.

Texas Instruments Product Preview SPWS027, "TNETX3150 ThunderSWITCH™ 15–Port 10–/100–MBIT/S Ethernet™ Switch," pp. 1–85, Sep. 1996.

DUAL PRIORITY CHAINS FOR DATA-COMMUNICATION PORTS IN A MULTI-PORT BRIDGE FOR A LOCAL AREA NETWORK

This application claims the benefit of U.S. Provisional Application No. 60/059,171, filed Sep. 17, 1997, entitled, "MULTI-PORT BRIDGE FOR A LOCAL AREA NETWORK."

FIELD OF THE INVENTION

The invention relates to a multi-port bridge for a local area network. More particularly, the invention relates to prioritizing accesses to a high speed communication bus by data-communication ports in a multi-port bridge for a local area network.

BACKGROUND OF THE INVENTION

Nodes of a local area network (LAN) are typically interconnected by a shared transmission medium. The amount of data traffic that the shared transmission medium can accommodate, however, is limited. For example, only one node at a time can successfully transmit data to another node over the shared transmission medium. If two or more nodes simultaneously attempt to transmit data, a data collision occurs, which tends to corrupt the data being transmitted. Thus, nodes that share a transmission medium are considered to be in a same collision domain.

A multi-port bridge allows simultaneous communication between nodes of the LAN by segmenting the LAN into multiple collision domains (also referred to as network segments), each segment having a corresponding transmission medium. FIG. 1 illustrates a conventional local area network (LAN) including a multi-port bridge 20. The multi-port bridge 20 in this example has eight ports A–H, though the number of ports can vary. Each port A–H is connected to a segment 21–28 of the LAN. Each segment 21–28 typically includes one or more nodes 29–44, such as a workstation, a personal computer, a data terminal, a file server, a printer, a facsimile machine, a scanner, or other conventional digital device. Each of the nodes 29–44 has an associated node address which uniquely identifies the node. The nodes 29–44 are configured to send data, one to another.

When the LAN operates according to Ethernet standards, such as the Institute of Electrical and Electronics Engineers (IEEE) 802.3 standard, data is communicated in the form of discrete packets. FIG. 2 illustrates a conventional IEEE 802.3 data packet 50. The data packet 50 includes an eight byte long pre-amble 51 which is generally utilized for synchronizing a receiver to the data packet 50. The pre-amble includes seven bytes of pre-amble and one byte of start-of-frame. Following the pre-amble 51, the data packet 50 includes a six byte long destination address 52, which is the node address of a node which is an intended recipient for the data packet 50. Next, the data packet 50 includes a six byte long source address 53, which is the node address of a node which originated the data packet 50. Following the source address 53 is a two-byte length field 54. Following the length field 54 is a data field 55. The data field 55 can be up to 1500 bytes long. Finally, the data packet 50 includes a four-byte frame check field 56 which allows a recipient of the data packet 50 to determine whether an error has occurred during transmission of the data packet 50.

When a node (source node) sends data to another node (destination node) located on its same segment of the LAN (intra-segment communication), the data is communicated directly between the nodes without intervention by the multi-port bridge 20 and is known as an intra-segment packet. Therefore, when the multi-port bridge 20 receives an intra-segment packet, the multi-port bridge 20 does not bridge the packet (the packet is filtered). When a node (source node) sends a data packet to another node (destination node) located on a different segment (inter-segment communication), the multi-port bridge 20 appropriately forwards the data packet to the destination node.

Packets are received by the ports of a multi-port bridge at varying times. The multi-port bridge, however, must respond to each packet for appropriately bridging or filtering the packet. Problems case arise, however, when the multi-port bridge is still in the process of responding to a packet when additional packets are received by the multi-port bridge. Therefore, what is needed is improved technique for responding to packets received by the multi-port bridge according to an appropriate priority.

SUMMARY OF THE INVENTION

The invention is a method of and apparatus for prioritizing accesses to a high speed communication bus by data-communication ports in a multi-port bridge for a local area network. The multi-port bridge includes a switch engine, a memory and a plurality of data-communication ports, all of which are interconnected by a high speed communication bus. The switch engine includes a bus controller, a memory controller and a look-up controller, each preferably being a finite state machine. The memory controller provides an interface between the memory and the communication bus. The bus controller controls access to the communication bus by collecting requests and granting the requests according to an appropriate priority. The look-up controller determines to which port each packet is to be directed based upon the destination node address for the packet.

The high speed communication bus includes single-bit signal lines dedicated to communicating control commands, signal lines dedicated to communicating data, and several signal lines having special purposes. For example, two signal lines, IRQ (for interrupts) and REQ (for requests), are preferably dedicated to initiating access to the bus, each having a respective priority, another signal line is dedicated to jam requests (for applying backpressure), still another signal line is dedicated to the memory controller and yet another signal line is dedicated to providing a bus clock signal. The memory includes look-up tables utilized for appropriately directing data packets among the ports, packet buffers utilized for temporarily storing packets and mailboxes for providing an interface between the switch engine and an external processor.

Each port includes a port controller, a MAC transceiver, receive finite state machine, a transmit finite state machine, a receive buffer, a transmit buffer and a memory pointer buffer. Each port transmits to and receives data from its corresponding LAN segment according to its corresponding data rate. In the preferred embodiment, each port is configured to be either a 100 Mbps port or a 10 Mbps port. Ports configured for transmitting data at other rates could be used and, thus, fall within the teachings of the present invention. Packets received from a LAN segment by the transceiver are directed to the communication bus through the receive buffer, while packets to be transmitted over the LAN segment are directed to the transceiver through the transmit buffer. The memory pointer buffer stores memory pointers in a queue for transmission by the port, one memory pointer for each data packet being stored in the packet buffers of the memory.

The ports access the communication bus in the following manner. The bus control module monitors the IRQ line and the REQ line. A port requiring access to the bus raises the IRQ line or the REQ, depending upon the circumstances. The bus control module then grants access to the bus according to an appropriate priority. Preferably, attempts to access the bus via the IRQ line are granted according to a higher priority than via the REQ line. According to the preferred embodiment, assuming multiple ports have raised the IRQ line, ports having a higher data rate have a higher priority than ports having a lower data rate. Similarly, assuming multiple ports have raised the REQ line, ports having a higher data rate have a higher priority than ports having a lower data rate.

Further, assuming equal data rates, a port serviced more recently has a lower priority than a port serviced less recently. More particularly, ports of a like type (e.g. having the same data rate) have a predetermined relative order that repeats. For example, ports of a like type are preferably ordered according to a port number assigned to each, with the lowest port number being adjacent in the predetermined order to the highest port number. Preferably, when multiple ports are attempting to obtain access to the bus by raising the same bus line (all either raise the IRQ line or the REQ line) and the multiple ports attempting to obtain access to the bus are of the same port type, then the port most recently serviced has a lowest priority relative the other ports while the port next in the predetermined order immediately after the port most recently serviced has the highest priority. The remaining ports have intermediate levels of priority according to the predetermined order. Of those ports attempting to gain access to the bus, the port having the highest priority is granted access to the bus.

Logic utilized in the bus controller for granting access to the ports according to the priority discussed above includes an interrupt/request decoder, a port-type decoder and a plurality of chain encoders, one pair of chain encoders for each of the IRQ and REQ accesses to the communication bus. The interrupt/request decoder, type decoder and chain encoders operate in conjunction to determine which port is to be granted access to the bus within one cycle of the bus clock signal. Thus, the access to the communication bus is granted with a minimum of delay.

DETAILED DESCRIPTION OF A PREFERRED EMBODIMENT

In the preferred embodiment, the present invention is utilized for appropriately directing packets through a multi-port bridge for an Ethernet LAN. It will be apparent, however, that other devices in an Ethernet LAN, such as a switch or a router, or devices in a network operating according to another networking standard, can utilize the advantages of the present invention.

The following documents are hereby incorporated by reference: U.S. patent application Ser. No. 08/946,866, filed Oct. 8, 1997, and entitled, "PER-PACKET JAMMING IN A MULTI-PORT BRIDGE FOR A LOCAL AREA NETWORK", now U.S. Pat. No. 5,884,040, issued on Mar. 16, 1999; U.S. patent application Ser. No. 08/947,081, filed Oct. 8, 1997, and entitled, "METHOD AND APPARATUS FOR PERIODICALLY UPDATING ENTRIES IN A CONTENT ADDRESSABLE MEMORY", now U.S. Pat. No. 5,940,597, issued on Aug. 17, 1999; U.S. patent application Ser. No. 09/025,355, filed Feb. 18, 1998, and entitled, "MEMORY CONTROLLER IN A MULTI-PORT BRIDGE FOR A LOCAL AREA NETWORK"; and U.S. patent application Ser. No. 09/025,356, filed Feb. 18, 1998, and entitled, "HIGH SPEED BUS STRUCTURE IN A MULTI-PORT BRIDGE FOR A LOCAL AREA NETWORK."

Figure 1:
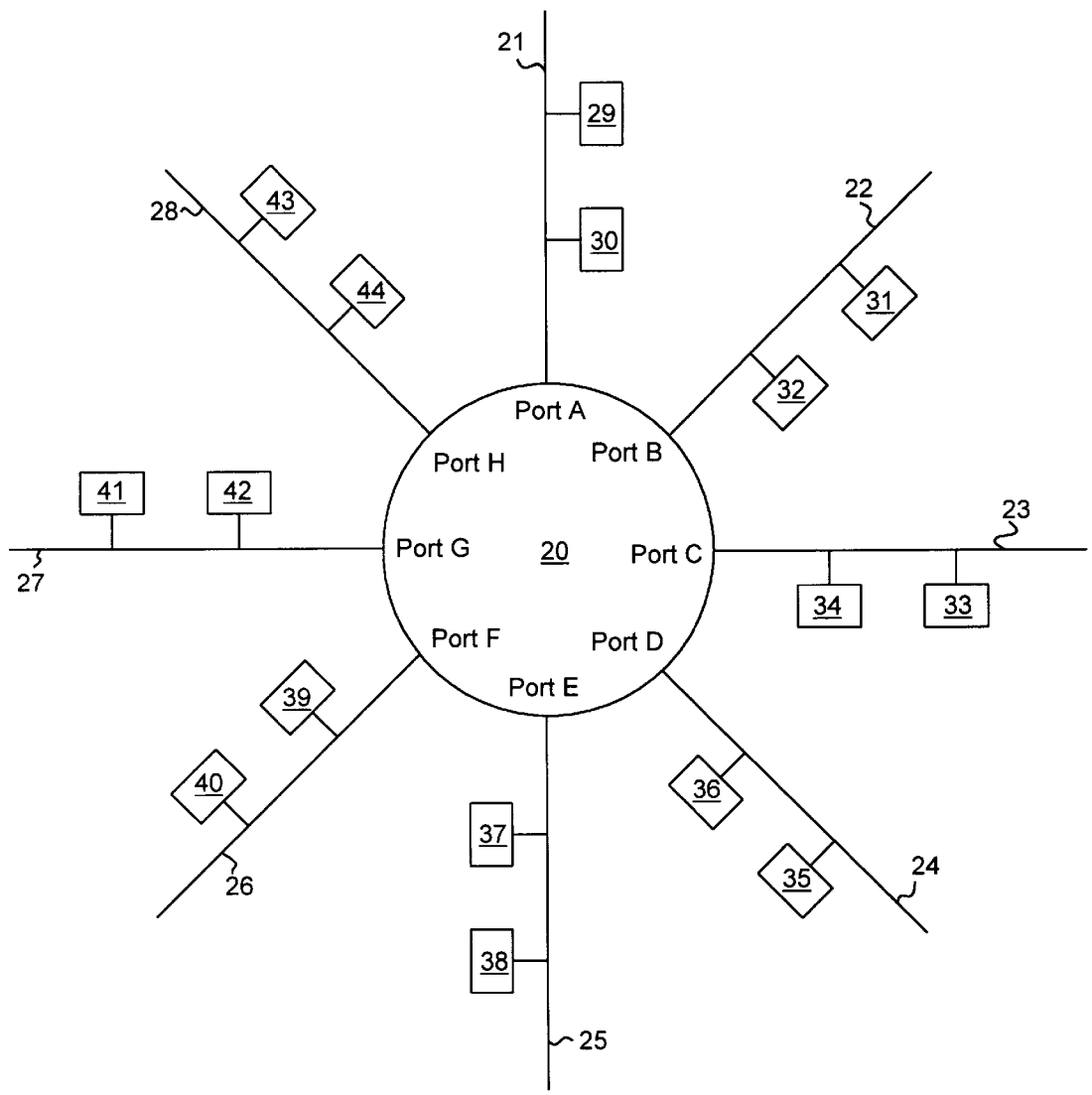
FIG. 1 illustrates a conventional local area network (LAN) including a multi-port bridge.
Figure 2:
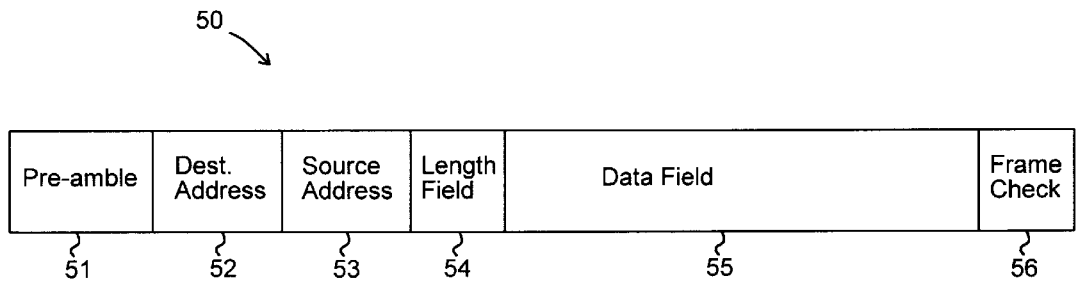
FIG. 2 illustrates a conventional IEEE 802.3 data packet.
Figure 3:
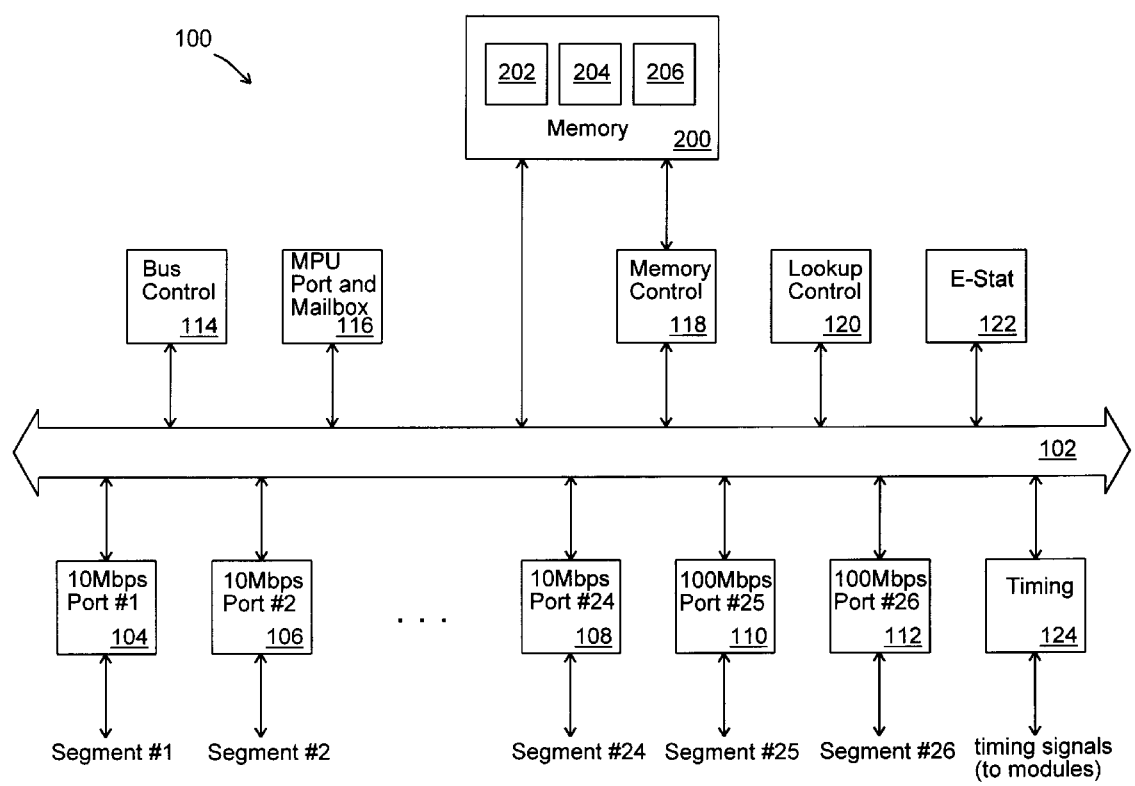
FIG. 3 illustrates a block schematic diagram of a switch engine for a multi-port bridge according to the present invention.

FIG. 3 illustrates a block schematic diagram of a multi-port bridge 100 according to the present invention. A high speed communication bus 102 provides an interconnection for each of the functional blocks 104–124 of the multi-port bridge 100. The communication bus 102 preferably includes five command lines and thirty-two data lines, though it will be apparent that other bus configurations can be utilized. According to the preferred embodiment, twenty-four 10 Mbps ports 104–108 and two 100 Mbps ports 110–112 are each coupled to the communication bus 102 and can be coupled to a respective LAN segment, each LAN segment having one or more nodes. Each of the twenty-four 10 Mbps ports 104–108 transmit and receive data packets at a rate of 10 Mbps, whereas, the two 100 Mbps ports 110–112 transmit and receive data packets at a rate of 100 Mbps. It will be apparent, however, that other numbers of ports, other port configurations and other performance characteristics can be utilized.

A bus control module 114 controls access to the communication bus 102 by collecting requests from the ports 104–112 and from the other modules. Based upon the requests, the bus control module 114 grants access to the communication bus 102 according to an appropriate priority, as explained herein. The bus control module 114 also controls access to a memory device 200 by an external processor 600 (FIG. 14), as explained herein. An MPU port and mailbox module 116 provides an interface between the multi-port bridge 100 and the external processor 600 for performing various functions, as is also explained herein. These functions include loading data into registers of the multi-port bridge 100, reading data from registers of the multi-port bridge 100 and transferring data packets between the external processor 600 and the ports 104–112 of the multi-port bridge 100.

A memory control module 118 provides an interface between the memory device 200 and the communication bus 102 and also provides an interface between the memory device 200 and a look-up control module 120. The memory device 200 includes mailboxes 202 for exchanging information between the external processor and the multi-port bridge 100. In addition, the memory device includes look-up tables 204. The look-up tables 204 include entries which indicate which port of the multi-port bridge 100 is associated with each node of the LAN and also include group addresses for multi-cast packets. The look-up tables 204 are utilized for appropriately directing among the ports 104–112 data packets received by the multi-port bridge 100.

The look-up control module 120 receives addresses of nodes and associated port identifications from the communication bus 102. Those addresses and identifications are stored in the look-up table 204. The look-up control module 120 also facilitates utilizing the look-up table 204 for directing packets among the ports 104–112 based upon the destination address of each packet. The memory device 200 also includes packet buffers 206 for temporarily storing data packets that are being directed through the multi-port bridge. The memory device 200 is preferably an SDRAM device, though other types of memory devices can be utilized, such as DRAM, SRAM, RAM or EDO. In the case of dynamic memory, the memory control module 118 refreshes the memory device 200 as required. For refreshing the memory device 200, the bus 102 is accessed by the memory control module 118, though accesses for this purpose are granted according to priority that is higher than accesses initiated by the ports #1–26 104–112.

An E-stat module 122 collects data packet routing statistics and provides them to the external processor 600 for performing analysis and network management functions. A timing module 124 provides timing signals to the ports 104–112 and to the other modules 114–122 of the multi-port bridge 100. Preferably, a primary clock signal cycles at 40 MHz. Other clock signals, at 10 MHz and 25 MHz, are derived from the primary clock signal.

Preferably, the modules 114–124 are each implemented as a finite state machine, though the modules 114–124 can alternately be implemented as one or more processors or controllers operating according to stored software programs. Finite state machines are preferred, however, as they can generally perform the necessary operations faster, thus, resulting in a higher packet handling bandwidth for the multi-port bridge 100.

Figure 4:
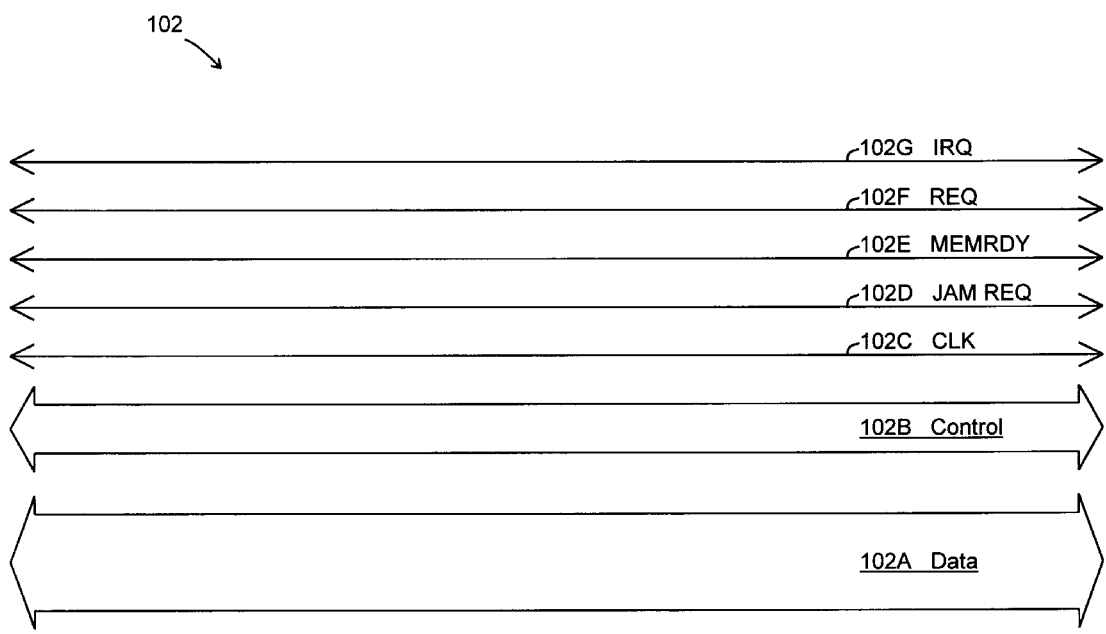
FIG. 4 illustrates a diagram of signal lines included in a high speed communication bus according to the present invention.

FIG. 4 illustrates a diagram of the signal lines included in the high speed communication bus 102 of FIG. 3. The communication bus 102 preferably includes thirty-two data lines 102A, five control lines 102B, a clock CLK line 102C, a jam request JAM REQ line 102D, a memory ready MEMRDY line 102E, a request REQ line 102F and an interrupt IRQ line 102G, though it will be apparent that other bus configurations can be utilized.

Table 1 illustrates preferred commands and associated data appearing on the communication bus 102 during operation of the multi-port bridge 100, as explained herein.

TABLE 1

| Control Code | Data 31–24 | Data 23–0 | Description |
|---|---|---|---|
| 00 Hex | | | transfer in progress/no action |
| 01 | # of transfer | starting memory address | memory read |
| 02 | # of transfer | starting memory address | memory write |
| 03 | source port ID & dest. and source addresses | | look-up |
| 04 | signal line of port granted access | | bus-grant-for-REQ |
| 05 | signal lines of all interrupting ports | | poll-interrupt |
| 06 | signal lines of all requesting ports | | poll-request |
| 07 | | | reserved |
| 08 | source port ID & bit-map of all dest. ports | | look-up ready |
| 09 | source port ID & dest. and source addresses | | look-up (gated with MEMRDY) |
| 0A | | | reserved |
| 0B | | | reserved |
| 0C | register data | | register load |
| 0D | register data | | register read |
| 0E | | | reserved |
| 0F | last transfer (as previously defined) | | bus-release |
| 10 | source port ID & dest. port ID | | new packet transfer to memory (cut-through possible) |
| 11 | source port ID & dest. port ID | | cont. packet transfer to memory (cut-through not possible) |
| 12 | # of transfer | memory starting address | write packet header to memory |
| 13 | | | reserved |
| 14 | signal line of port granted access | | bus-grant-for-IRQ |

Referring to Table 1, the Control Codes (commands) applied to the control lines 102B are given as hexadecimal values, while the associated data applied to the data lines 102A and the function performed by each command are described. Because there are five control lines 102B, there can be up to thirty-two different commands (between 00 H and 1F H). As shown in Table 1, however, fewer commands are preferred. Table 1 shows hexadecimal values for the preferred embodiment. It will be apparent, however, that other bit assignments and another set of commands can be implemented and still follow the teachings of the present invention.

Figure 5:
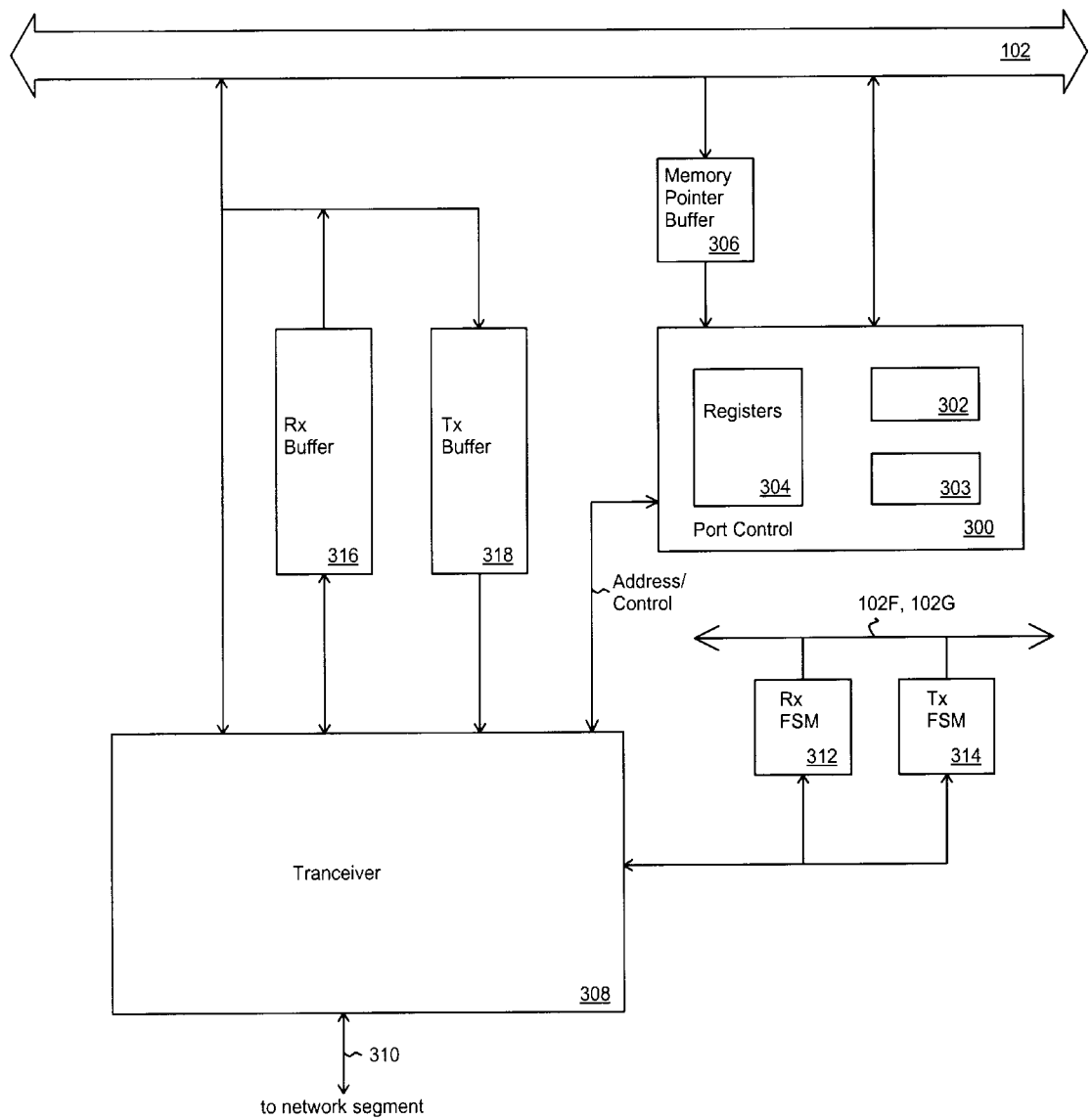
FIG. 5 illustrates a block schematic diagram of a port of the switch engine according to the present invention.

FIG. 5 illustrates a block schematic diagram of one of the ports 104–112 of the multi-port bridge 100 of FIG. 3. A port controller 300, including a bus interface 302, a memory pointer finite state machine (FSM) 303 and registers 304, provides control for the port and an interface between the port and the communication bus 102. The port controller 300 monitors the communication bus 102 for commands and data and also provides commands and data to the communication bus 102 at times when the port has control of the communication bus 102. The registers 304 contain data for configuring the port, initializing the port upon start-up, and for collecting status information for the port. An address latch included in the registers 304 latches addresses from the communication bus 102 and provides them to the transceiver 308. The registers 304 also contain a counter for storing a current state of the finite state machine of the port and registers for storing parameters for use by the finite state machines of the port.

Each port also includes a memory pointer FIFO buffer 306 coupled between the communication bus 102 and the port controller 300. The memory pointer buffer 306 stores memory pointers (explained herein) for data packets being queued in the packet buffers 206 (FIG. 3) of the memory device 200. Preferably, the memory pointers each have a predefined length. In addition, the memory pointer buffer 306 preferably holds 128 memory pointers, though it will be apparent that another capacity for the memory pointer buffer 306 can be selected.

The port also includes a medium access control (MAC) transceiver 308 which accesses a LAN segment 310 for transmitting and receiving data packets to and from the LAN segment 310. Associated with and coupled to the transceiver 308 are a receive finite state machine 312, for controlling the transceiver 308 during packet reception, and a transmit finite state machine 314, for controlling the transceiver 308 during packet transmission.

Packets received from the network segment 310 by the transceiver 308 are directed to the communication bus 102 through a receive FIFO buffer 316, while packets to be transmitted over the LAN segment 310 are directed from the communication bus 102 to the transceiver 308 through a transmit FIFO buffer 318. Preferably, the receive buffer 316 holds 128 bytes while the transmit buffer 318 holds 256 bytes, though other capacities can be selected. Note that an IEEE 802.3 data packet can include up to 1500 bytes of data in addition to the source address, the destination address and the frame check field. Thus, in the preferred embodiment, neither the receive buffer 316, nor the transmit buffer 318 is capable of storing a entire IEEE 802.3 data packet of the maximum size. The receive finite state machine 312 and the transmit finite state machine 314 are each coupled to the bus control module 114 (FIG. 3) for initiating access to the communication bus 102 by the port.

The ports 104–112 access the communication bus 102 in the following manner. The bus control module 114 (FIG. 3) monitors the interrupt IRQ line 102G (FIG. 4) and the request REQ line 102F (FIG. 4). A port requiring access to the bus 102 raises the IRQ line 102G or the request REQ line 102F, depending upon the circumstances. The IRQ line 102G is utilized for accessing the bus 102 for initiating a look-up cycle to determine which port or ports is an appropriate destination for a packet, whereas, the REQ line 102F is utilized for initiating memory read or write operation for transferring packet into or out of the packet buffers 206. The bus control module 114 grants access to the bus 102 according to an appropriate priority. Preferably, an interrupt IRQ is granted access to the bus 102 according to a higher priority than a request REQ. According to the preferred embodiment, ports having a higher data rate have a higher priority than ports having a lower data rate. For example, the 100 Mbps ports 110–112 have a higher priority than the 10 Mbps ports 104–108. Further, assuming equal data rates, a port serviced more recently has a lower priority than a port serviced less recently.

More particularly, ports of a like type (either 100 Mbps or 10 Mbps) have a predetermined relative order that repeats circularly. For example, the twenty-four 10 Mbps ports 104–108 (FIG. 3) are preferably ordered according to the port number of each, with port #1 being adjacent to port #24 in the predetermined order. Because there are preferably two of the 100 Mbps ports #25–26, relative priority for these two ports simply alternates between them. Preferably, when multiple ports are attempting to obtain access to the bus 102 by raising the same bus line (either the interrupt line 102G or the request REQ line 102F) and the multiple ports attempting to obtain access to the bus 102 are of the same port type (either 100 Mbps or 10 Mbps), then the port most recently serviced has a lowest priority relative the other ports while the port next in the predetermined order immediately after the port most recently serviced has the highest priority. The remaining ports are prioritized according to the predetermined order. The port which has the highest priority and which is attempting to gain access to the bus 102 is granted access to the bus 102.

Figure 6:
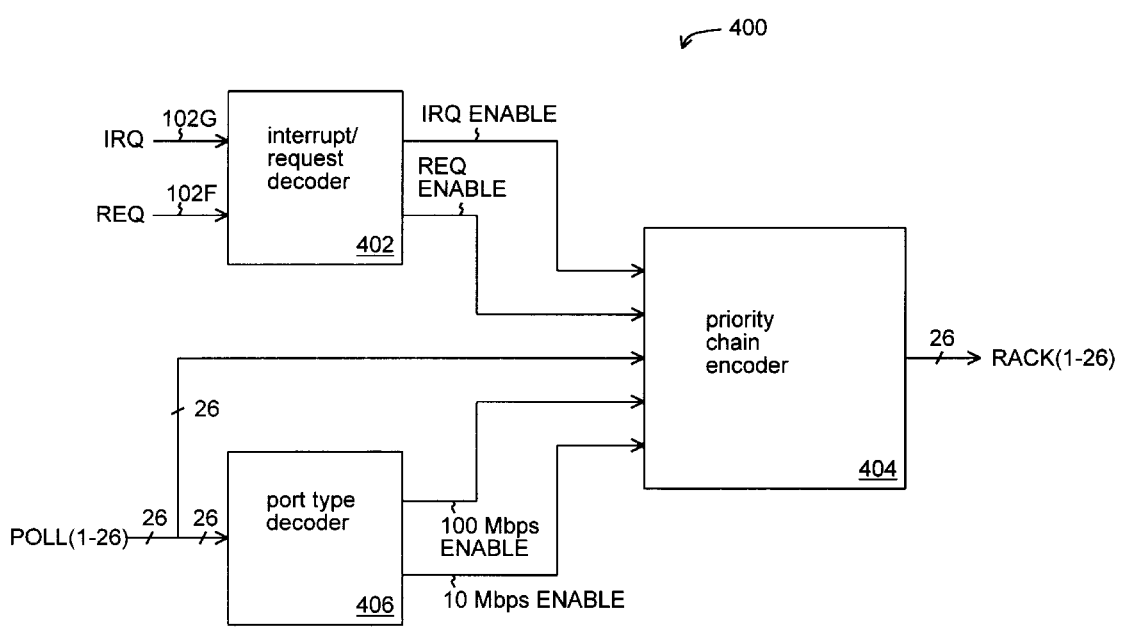
FIG. 6 illustrates a block schematic diagram of an interrupt control circuit according to the present invention.

FIG. 6 illustrates a block schematic diagram of an interrupt control circuit 400 included in the bus control module 114 (FIG. 3). The interrupt control circuit 400 includes an interrupt/request decoder 402. The request REQ line 102F (FIG. 4) and the interrupt IRQ line 102G (FIG. 4) of the communication bus 102 are coupled to respective inputs of the interrupt/request decoder 402. A first output of the interrupt/request decoder 402 is a signal IRQ ENABLE. A second output of the interrupt/request decoder is a signal REQ ENABLE. Preferably, when the IRQ line 102G is raised, then the signal IRQ ENABLE is a logical high voltage and the signal REQ ENABLE is a logical low voltage, regardless of the level of the REQ line 102F. When the REQ line 102F is raised and the IRQ line 102G is not raised, then the signal REQ ENABLE is a logical high voltage and the signal IRQ ENABLE is a logical low voltage. The signals IRQ ENABLE and REQ ENABLE are coupled to respective inputs of a priority chain encoder 404.

Figure 7:
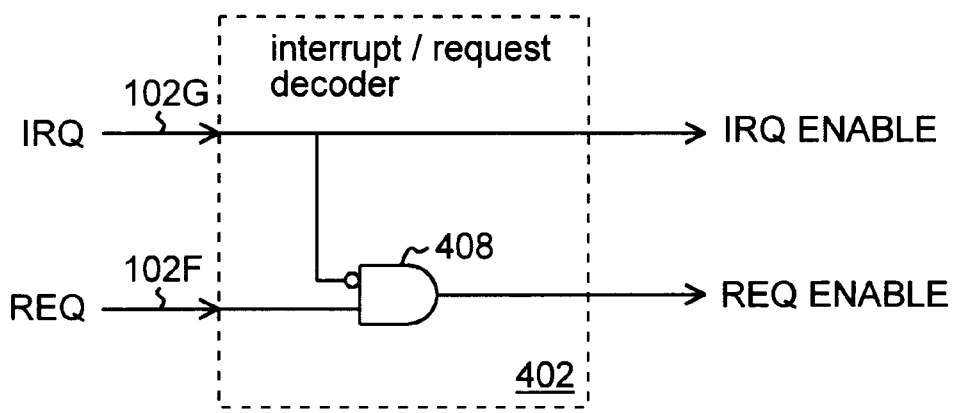
FIG. 7 illustrates a logic diagram of an interrupt/request decoder according to the present invention.

FIG. 7 illustrates a logic diagram of the interrupt/request decoder 402. Within the interrupt/request decoder 402, the interrupt IRQ line 102G (FIG. 4) is coupled to an inverting input of a logic AND gate 408 and to a first output of the interrupt/request decoder 402, forming the output signal IRQ ENABLE. The request REQ line 102F (FIG. 4) is coupled to a non-inverting input of the logic AND gate 408. An output of the logic AND gate 408 is coupled to a second output of the interrupt/request decoder 402, forming the output signal REQ ENABLE. When the interrupt IRQ line 102G is a logic high voltage, this logic high voltage is passed to the output signal IRQ ENABLE, while the AND gate 408 prevents a level of the request REQ line 102F from passing to the output signal REQ ENABLE. When the interrupt IRQ line 102G is a logic low voltage, this logic low voltage is passed to the output signal IRQ ENABLE, while the AND gate 408 is enabled to pass a level of the request REQ line 102F to the output signal REQ ENABLE. Accordingly, the interrupt/request decoder 402 assigns a higher priority to the interrupt IRQ line 102G than the request REQ line 102F.

When the communication bus 102 is available after the signal IRQ ENABLE is a logical high voltage, the bus control module 114 responds by placing a poll-interrupt command 05 H (Table 1) on the control lines 102B of the bus 102. While the poll-interrupt command 05 H is on the control lines 102B, each port having a pending interrupt IRQ raises a corresponding one signal line of the data lines 102A. For this purpose, each of the ports #1–26 (104–112) are assigned a respective one signal line of the data lines 102A. Accordingly, the bus control module 114 discovers which of the ports has a pending interrupt IRQ by monitoring the data lines 102A while the poll-interrupt command 05 H is active.

Similarly, when the bus 102 is available after the signal REQ ENABLE is a logical high voltage, the bus control module 114 places a poll-request command 06 H (Table 1) on the control lines 102B of the bus 102. While the poll-request command 06 H is on the control lines 102B, each port having a pending request REQ raises its corresponding one signal line of the data lines 102A. Accordingly, the bus control module 114 discovers which of the ports has a pending request REQ by monitoring the data lines 102A while the poll-request command 06 H is active.

Figure 8:
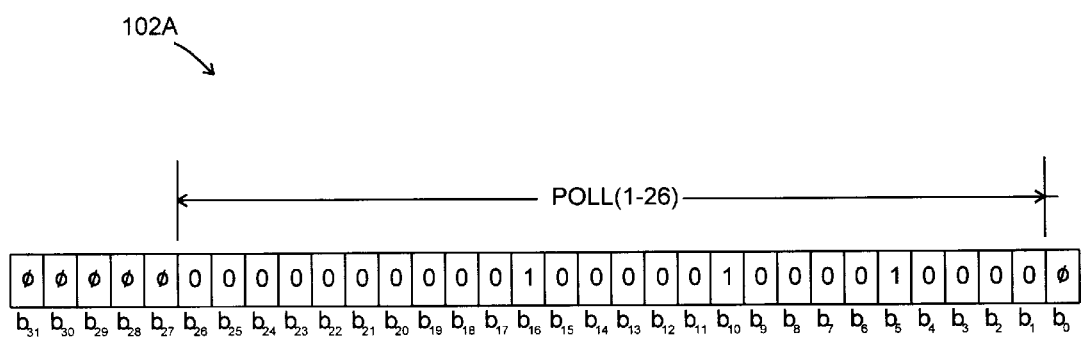
FIG. 8 illustrates a polling bit-map which appears on the high speed communication bus during poll-interrupt and poll-request commands according to the present invention.

This raising of the respective signal lines during the poll-interrupt command 05 H and during the poll-request command 06 H is referred to as a polling bit-map POLL (1–26). FIG. 8 illustrates a logic levels for each of the thirty-two data lines 102A of the bus 102 during the poll-interrupt command 05 H or during the poll-request command 06 H. As mentioned, each one of the twenty-six ports 104–112 (FIG. 3) is assigned to a respective one of the signal lines $b_0$–$b_{31}$. Thus, for example, port #1 is assigned to signal line $b_0$, port #2 is assigned to signal line $b_1$, port #3 is assigned to signal line $b_2$, and so forth, with port #26 assigned to signal line $b_{25}$. In the preferred embodiment, signal lines $b_{26}$–$b_{31}$ are not included in the polling bit-map POLL(1–26) because they are not assigned to any port. Assume that ports #5, #10 and #16 are each attempting to gain access to the bus via the interrupt IRQ line 102G. Therefore, as illustrated in FIG. 8, during the poll-interrupt command 05 H, the polling bit-map POLL(1–26) includes logic one's for signal lines $b_4$, $b_9$, and $b_{15}$; signal lines $b_{26}$–$b_{31}$ are don't cares because they are unassigned; and the remaining signal lines $b_0$–$b_3$, $b_5$–$b_8$, $b_{10}$–$b_{14}$ and $b_{16}$–$b_{25}$ are logic zeros.

The polling bit-map POLL(1–26) is applied to an input of a port-type decoder 406 (FIG. 6) and to an input of the priority chain encoder 404 (FIG. 6). A first output of the port-type decoder 406 is a signal 100 Mbps ENABLE. A second output of the port type decoder 406 is a signal 10 Mbps ENABLE. When one of the 100 Mbps ports 110–112 (FIG. 3) raises its respective signal line while the poll-interrupt command 05 H or the poll-request command 06 H is active, then the signal 100 Mbps ENABLE is a logical high voltage and the signal 10 Mbps ENABLE is a logical low voltage, regardless of whether one of the 10 Mbps ports 104–108 (FIG. 3) has raised its respective signal line. When one of the 10 Mbps ports 104–108 raises its respective signal line and none of the 100 Mbps ports 110–112 has raised its respective signal line, then the signal 10 Mbps ENABLE is a logical high voltage and the signal 100 Mbps ENABLE is a logical low voltage.

Figure 9:
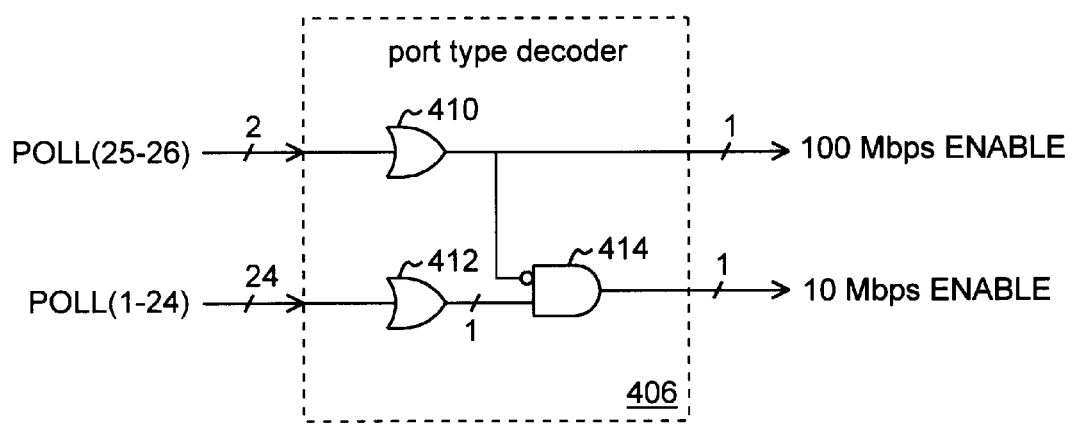
FIG. 9 illustrates a logic diagram of a port type decoder according to the present invention.

FIG. 9 illustrates a logic diagram of the port type decoder 406 (FIG. 6). Within the port type decoder 406, signal lines $b_{24}$ and $b_{25}$ of the polling bit-map POLL(25–26) are coupled to respective inputs of a two-input logic OR gate 410. Signal lines $b_0$–$b_{23}$ of the polling bit-map POLL(1–24) are coupled to respective inputs of a twenty-four input logic OR gate 412. An output of the logic OR gate 410 is coupled to an inverting input of a logic AND gate 414 and to a first output of the port type decoder 406, forming the signal 100 Mbps ENABLE. An output of the logic OR gate 412 is coupled to a non-inverted input of the logic AND gate 414. An output of the logic AND gate 414 is coupled to a second output of the port type decoder 406, forming the signal 10 Mbps ENABLE.

When one of the 100 Mbps ports 110–112 (FIG. 3) raises its respective signal line, this logic high voltage is passed to the output signal 100 Mbps ENABLE via the logic OR gate 410, while the AND gate 414 prevents a level of any of the signal lines for the 10 Mbps ports 104–108 from passing to the output signal 10 Mbps ENABLE. When one of the 10 Mbps ports 104–108 raises its respective signal line and none of the 100 Mbps ports 110–112 has raised its respective signal line, then the output of the logic OR gate 410 a logical low voltage and the output of the logic OR gate 412 is logic high voltage. Thus, the AND gate 414 is enabled to pass the level of the output of the logic OR gate 412 to the output signal 10 Mbps ENABLE. Accordingly, port-type decoder 406 assigns a higher priority to the 100 Mbps ports 110–112 than to the 10 Mbps ports 104–108.

The priority chain encoder 404 (FIG. 6) forms twenty-six request acknowledge signals RACK(1–26), including one signal line corresponding to each of the ports #1–26. When a port is granted access to the bus 102, the signal line for the one port which is granted access to the bus is raised to a logic high voltage, while the signal lines for all the other ports are a logic low voltage.

In response to receiving the polling bit-map POLL(1–26) during the poll-interrupt command 05 H, the bus control module 114 grants access to the bus 102 in the appropriate priority by placing a bus-grant-for-IRQ command 14 H (Table 1) on the control lines 102B of the bus 102 and also by raising the respective one signal line that corresponds to the port being granted access to the bus 102 by coupling the signal RACK(1–26) to the data lines 102A (FIG. 4). Upon being granted access to the bus 102, the designated port then has control of the bus 102.

Similarly, in response to receiving the polling bit-map POLL(1–26) during the poll-request command 06 H, the bus control module 114 grants access to the bus 102 in the appropriate priority by placing a bus-grant-for-REQ command 04 H (Table 1) on the control lines 102B of the bus 102 and also by raising the one signal line that corresponds to the port being granted access to the bus 102 by coupling the signal RACK(1–26) to the data lines 102A (FIG. 4). Upon being granted access to the bus 102, the designated port then has control of the bus 102.

Figure 10:
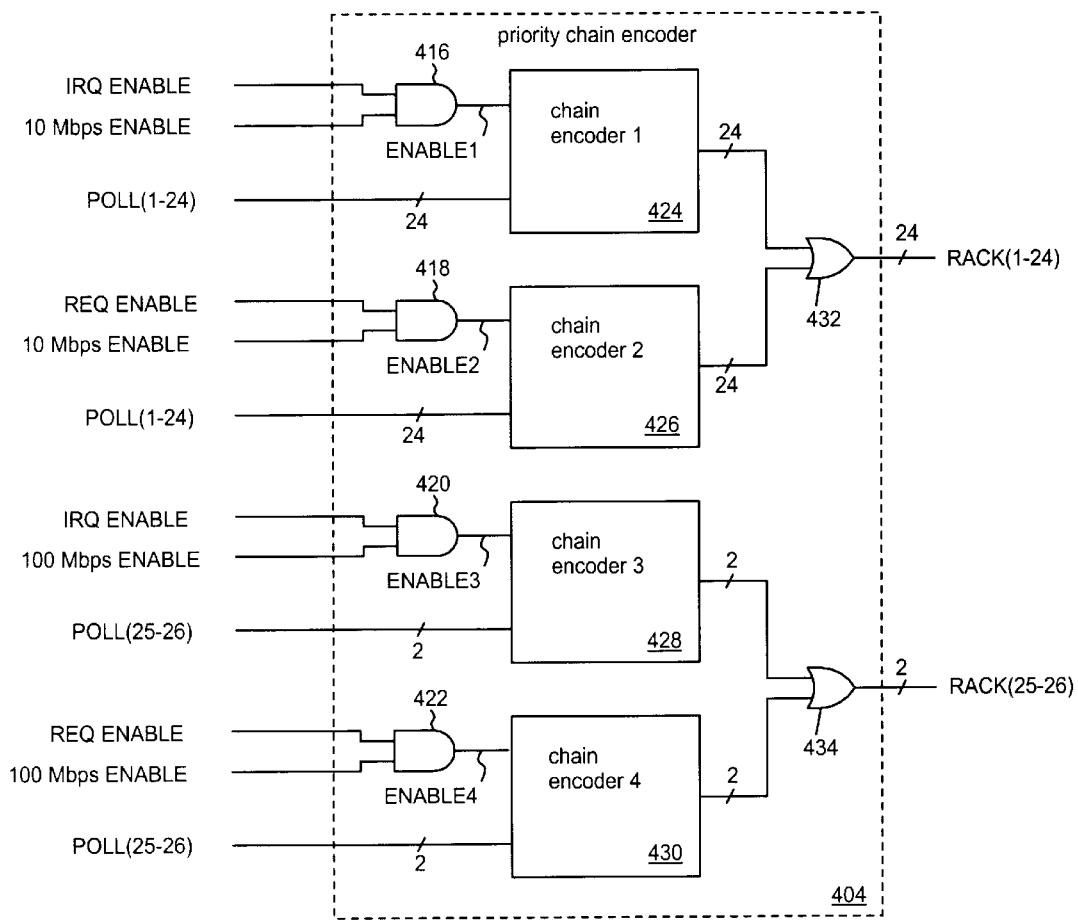
FIG. 10 illustrates a block schematic diagram of a priority chain encoder circuit according to the present invention.

FIG. 10 illustrates a block schematic diagram of the priority chain encoder 404 (FIG. 6). Within the priority chain encoder 404, the signal IRQ ENABLE (FIGS. 6–7) is coupled to a first input of a logic AND gate 416 and to a first input of a logic AND gate 420. The signal REQ ENABLE (FIGS. 6–7) is coupled to a first input of a logic AND gate 418 and to a first input of a logic AND gate 422. The signal 10 Mbps ENABLE is coupled to a second input of the logic AND gate 416 and to a second input of the logic AND gate 418. The signal 100 Mbps ENABLE is coupled to a second input of the logic AND gate 420 and to a second input of the logic AND gate 422.

An output of the logic AND gate 416 forms a signal ENABLE1. The signal ENABLE1 and signal lines $b_0$–$b_{23}$ of the polling bit-map POLL(1–24) are coupled to as inputs of a first chain encoder 424. An output of the logic AND gate 418 forms a signal ENABLE2. The signal ENABLE2 and signal lines $b_0$–$b_{23}$ of the polling bit-map POLL(1–24) are coupled to as inputs of a second chain encoder 426. An output of the logic AND gate 420 forms a signal ENABLE3. The signal ENABLE3 and signal lines $b_{24}$–$b_{25}$ of the polling bit-map POLL(25–26) are coupled to as inputs of a third chain encoder 428. An output of the logic AND gate 422 forms a signal ENABLE4. The signal ENABLE4 and signal lines $b_{24}$–$b_{25}$ of the polling bit-map POLL(25–26) are coupled to as inputs of a fourth chain encoder 430.

The first chain encoder 424 and the second chain encoder 426 each form a twenty-four bit output. Each twenty-four bit output includes one signal line corresponding to each of the ports #1–24. The signal line for a port being granted access to the bus 102 is a logic high voltage, while the other twenty-three signal lines are a logic low voltage. Each bit of the twenty-four bit outputs are OR'd together by a logic OR gate 432. For illustration purposes, a single logic OR gate 432 is shown, however, the logic OR gate performs the function of twenty-four two-input logic OR gates. An output of the logic OR gate 432 forms the signal RACK(1–24).

The third chain encoder 428 and the fourth chain encoder 430 each form a two bit output. Each two bit output includes one signal line corresponding to each of the ports #25–26. The signal line for a port being granted access to the bus 102 is a logic high voltage, while the other signal line is a logic low voltage. Each bit of the two bit outputs are OR'd together by a logic OR gate 434. For illustration purposes, a single logic OR gate 434 is shown, however, the logic OR gate performs the function of two two-input logic OR gates. An output of the logic OR gate 434 forms the signal RACK(25–26).

Figure 11:
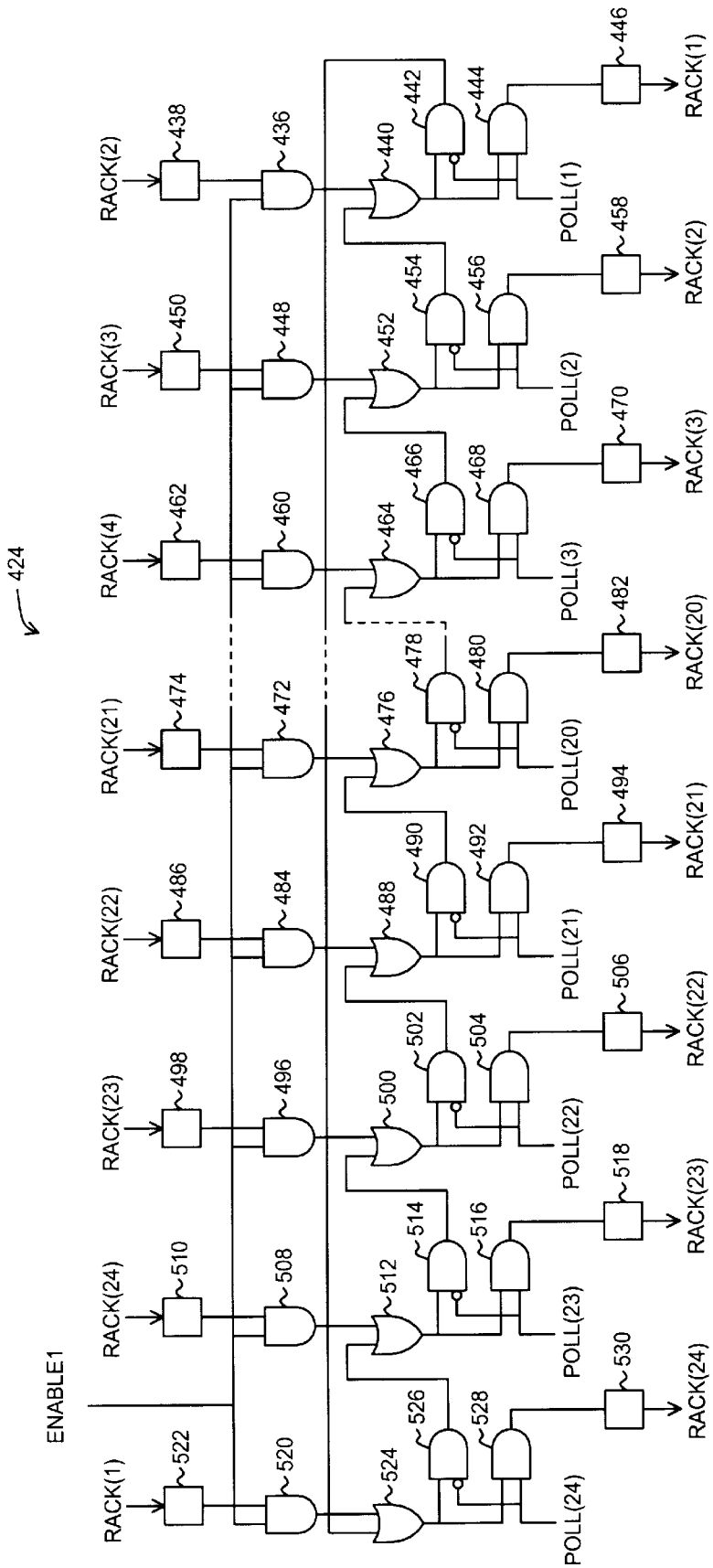
FIG. 11 illustrates a logic diagram of a single chain of the chain encoder circuit according to the present invention having twenty-four "links".

FIG. 11 illustrates a logic diagram of the first chain encoder circuit 424 of the priority chain encoder 404. The signal ENABLE1 is coupled to a first input of a logic AND gate 436. A second input of the logic AND gate 436 is coupled to a memory cell 438. The memory cell 438 stores the bit RACK(2). An output of the logic AND gate 436 is coupled to a first input of a logic OR gate 440. An output of the logic OR gate 440 is coupled to a first input of a logic AND gate 442 and to a first input of a logic AND gate 444. The signal line $b_0$ of the polling bit-map POLL(1) is coupled to a second, inverted, input of the logic AND gate 442 and to a second input of the logic AND gate 444. An output of the logic AND gate 444 is coupled to a memory cell 446. The memory cell 446 stores the bit RACK(1).

The signal ENABLE1 is also coupled to a first input of a logic AND gate 448. A second input of the logic AND gate 448 is coupled to a memory cell 450. The memory cell 450 stores the bit RACK(3). An output of the logic AND gate 448 is coupled to a first input of a logic OR gate 452. An output of the logic OR gate 452 is coupled to a first input of a logic AND gate 454 and to a first input of a logic AND gate 456. The signal line $b_1$ of the polling bit-map POLL(2) is coupled to a second, inverted, input of the logic AND gate 454 and to a second input of the logic AND gate 456. An output of the logic AND gate 454 is coupled to a second input of the logic OR gate 440. An output of the logic AND gate 456 is coupled to a memory cell 458. The memory cell 458 stores the bit RACK(2).

The signal ENABLE1 is also coupled to a first input of a logic AND gate 460. A second input of the logic AND gate 460 is coupled to a memory cell 462. The memory cell 462 stores the bit RACK(4). An output of the logic AND gate 460 is coupled to a first input of a logic OR gate 464. An output of the logic OR gate 464 is coupled to a first input of a logic AND gate 466 and to a first input of a logic AND gate 468. The signal line $b_2$ of the polling bit-map POLL(3) is coupled to a second, inverted, input of the logic AND gate 466 and to a second input of the logic AND gate 468. An output of the logic AND gate 466 is coupled to a second input of the logic OR gate 452. An output of the logic AND gate 468 is coupled to a memory cell 470. The memory cell 470 stores the bit RACK(3).

Together, the memory cells 438, 446, logic AND gates 436, 442, 444 and logic OR gate 440 form a first "link" in the chain encoder 424. Similarly, the memory cells 450, 458, logic AND gates 448, 454, 456 and logic OR gate 452 form a second link in the chain encoder 424. The first link is coupled to the second link by the output of the logic AND gate 454 being coupled to the second input of the logic OR gate 440. The memory cells 462, 470, logic AND gates 460, 466, 468 and logic OR gate 464 form a third link in the chain encoder 424. The second link is coupled to the third link by the output of the logic AND gate 466 being coupled to the second input of the logic OR gate 452.

Because there are twenty-four 10 Mbps ports, there are preferably twenty-four links of like construction in the chain encoder 424, though it will be apparent that if another number of 10 Mbps ports were utilized, the chain encoder 424 would include a corresponding number of links. For illustration purposes, only eight links are shown in FIG. 11 (the first through third and twentieth through twenty-fourth), with the remaining sixteen links (fourth through nineteenth) being represented by a dotted line between a second input of the logic OR gate 464 and an output of a logic AND gate 478 and as a dotted line between a first input of the logic AND gate 460 and a first input of a logic AND gate 472.

The twentieth link includes memory cell 474 for storing the bit RACK(21), memory cell 482 for storing the bit RACK(20), logic AND gates 472, 478, 480, and logic OR gate 476. A twenty-first link includes memory cell 486 for storing the bit RACK(22), memory cell 494 for storing the bit RACK(21), logic AND gates 484, 490, 492, and logic OR gate 488. The twenty-first link is coupled to the twentieth link by the output of the AND gate 490 being coupled to an input of the OR gate 476.

A twenty-second link includes memory cell 498 for storing the bit RACK(23), memory cell 506 for storing the bit RACK(22), logic AND gates 496, 502, 504, and logic OR gate 500. The twenty-second link is coupled to the twenty-first link by the output of the AND gate 502 being coupled to an input of the OR gate 488. A twenty-third link includes memory cell 510 for storing the bit RACK(24), memory cell 518 for storing the bit RACK(23), logic AND gates 508, 514, 516, and logic OR gate 512. The twenty-third link is coupled to the twenty-second link by the output of the AND gate 514 being coupled to an input of the OR gate 500.

A twenty-fourth link includes memory cell 522 for storing the bit RACK(1), memory cell 530 for storing the bit RACK(24), logic AND gates 520, 526, 528, and logic OR gate 524. The twenty-fourth link is coupled to the twenty-third link by the output of the logic AND gate 526 being coupled to an input of the logic OR gate 512. The first link is coupled to the twenty-fourth link by the output of the logic AND gate 442 being coupled to an input of the logic OR gate 524. Thus, the links are coupled in a loop. Each link of the chain encoder 424 forms one bit of the request acknowledge signals RACK (1–24) which are OR'd together by the logic OR gate 432 (FIG. 10).

The second chain encoder circuit 426 (FIG. 10) is not shown as it is preferably identical to the chain encoder circuit 424 except that the input signal ENABLE 1 for the encoder circuit 424 is replaced with the signal ENABLE 2 for the encoder circuit 426.

Figure 12:
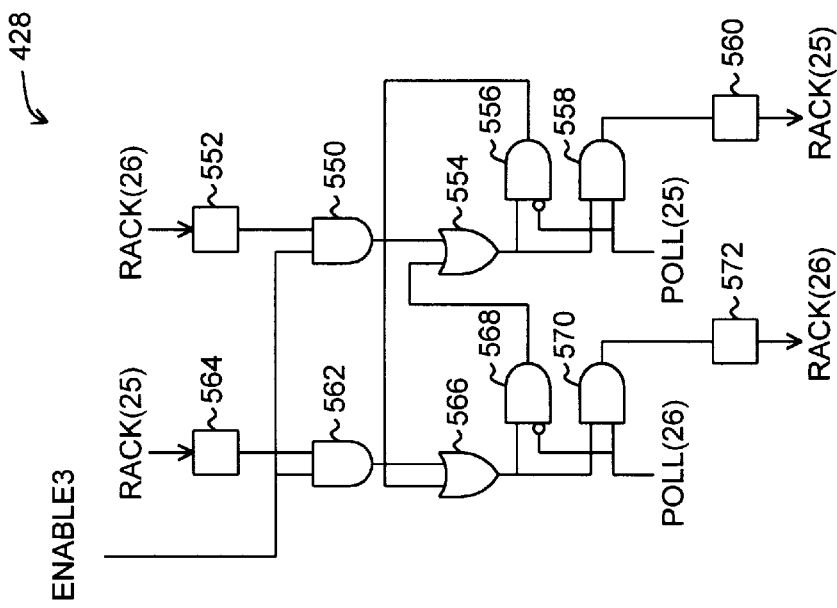
FIG. 12 illustrates a logic diagram of a single chain of the chain encoder circuit according to the present invention having two links.

FIG. 12 illustrates a logic diagram of the third chain encoder circuit 428 of the priority chain encoder 404. The signal ENABLE3 is coupled to a first input of a logic AND gate 550. A second input of the logic AND gate 550 is coupled to a memory cell 552. The memory cell 552 stores the bit RACK(26). An output of the logic AND gate 550 is coupled to a first input of a logic OR gate 554. An output of the logic OR gate 554 is coupled to a first input of a logic AND gate 556 and to a first input of a logic AND gate 558. The signal line $b_{24}$ of the polling bit-map POLL(25) is coupled to a second, inverted, input of the logic AND gate 556 and to a second input of the logic AND gate 558. An output of the logic AND gate 558 is coupled to a memory cell 560. The memory cell 560 stores the bit RACK(25).

The signal ENABLE3 is also coupled to a first input of a logic AND gate 562. A second input of the logic AND gate 562 is coupled to a memory cell 564. The memory cell 564 stores the bit RACK(25). An output of the logic AND gate 562 is coupled to a first input of a logic OR gate 566. An output of the logic OR gate 566 is coupled to a first input of a logic AND gate 568 and to a first input of a logic AND gate 570. The signal line $b_{25}$ of the polling bit-map POLL(26) is coupled to a second, inverted, input of the logic AND gate 568 and to a second input of the logic AND gate 570. An output of the logic AND gate 568 is coupled to a second input of the logic OR gate 554. An output of the logic AND gate 570 is coupled to a memory cell 572. The memory cell 458 stores the bit RACK(26). An output of the logic AND gate 556 is coupled to a second input of the logic OR gate 566.

The fourth chain encoder circuit 430 (FIG. 10) is not shown as it is preferably identical to the third chain encoder circuit 428 except that the input signal ENABLE3 for the encoder circuit 428 is replaced with the signal ENABLE4 for the encoder circuit 430.

The signals IRQ ENABLE, REQ ENABLE, 10 Mbps ENABLE and 100 Mbps ENABLE control which of the four chain encoder circuits 424, 426, 428, 430 is enabled in response to one or more ports attempting to obtain access to the bus 102. As explained above, the interrupt/request decoder 402 (FIGS. 6–7) forms the signals IRQ ENABLE and REQ ENABLE, while the port type decoder 406 (FIGS. 6 and 9) forms the signals 10 Mbps ENABLE and 100 Mbps ENABLE. These signals are combined by the AND gates 416, 418, 420, 422 (FIG. 10) for forming the signals ENABLE1, ENABLE2, ENABLE3 and ENABLE4 (FIGS. 10–12). Only one of the signals ENABLE1, ENABLE2, ENABLE3 or ENABLE4 is active at any one time.

For example, if one or more ports raise the interrupt IRQ line 102G, then the signal IRQ ENABLE is a logical high voltage. Also, if none of these ports having raised the interrupt IRQ line 102G are a 100 Mbps port, then the signal 10 Mbps ENABLE is a logical high voltage. In such case, the signal ENABLE1 is logical high voltage, while the signals ENABLE2, ENABLE3 and ENABLE4 are each a logical low voltage.

For each chain encoder circuit 424, 426, 428 and 430 (FIG. 10), after a port has been granted access to the bus 102, the contents of the lower set of memory cells (e.g. memory cells 530, 518, 506, 494, 482, 470, 458, 446 in FIG. 11; memory cells 572, 560 in FIG. 12) are transferred into the upper set of memory cells (e.g. memory cells 522, 510, 498, 486, 474, 462, 450, 438 in FIG. 11; memory cells 564, 552 in FIG. 12), offset by one link. For example, referring to FIG. 11, after the acknowledge signals RACK(L1–26) are placed on the data lines 102A during a bus-grant-for-IRQ command 14 H, then the content of the memory cell 470 is placed in memory cell 450; the content of memory cell 458 is placed into memory cell 438, the content of memory cell 446 is placed into memory cell 522; the content of memory cell 530 is placed into memory cell 510; the content of memory cell 518 is placed into memory cell 498, the content of memory cell 506 is placed into memory cell 486, and so forth.

More particularly, assuming that access to the bus 102 is granted to port #24, then the content of the memory cell 530 is a logic high voltage. The contents of each other memory cell of the lower set (e.g. memory cells 518, 506, 494, 482, 470, 458, 446) is a logic low voltage. These values are placed on the data lines 102A during a bus-grant-for-IRQ command 14 H, via the logic OR gate 432 (FIG. 10). Then, the logic high voltage from the memory cell 530 is transferred to the memory cell 510, while the other memory cells of the upper set (e.g. memory cells 522, 498, 486, 474, 462, 450, 438) store logic low voltage levels.

Assuming that a next IRQ poll-interrupt command 05 H results in a polling bit map where signal line $b_{20}$ POLL(21) and signal line b, POLL(2) are logic high voltages, and the remaining signal lines are logic low voltages. Accordingly, the logic AND gates 526, 514, 502, 492, 478, 466, 456 and 442 are enabled for passing a logic high voltage, while the logic AND gates 528, 516, 504, 490, 480, 468, 454, and 444 are disabled from passing a logic high voltage. Because the memory cell 510 has a logic high voltage stored, when the signal ENABLE1 is a logic high voltage, the output of the logic AND gate 508 also becomes a logic high voltage. Thus, the output of the logic OR gate 512 becomes a logic high voltage. This logic high voltage is passed by the logic AND gate 514, the logic OR gate 500, the logic AND gate 502 and the logic OR gate 488. The logic AND gate 490 however, is disabled from passing this logic voltage. Also, because the logic AND gate 492 is enabled to pass the logic high voltage from the logic OR gate 488, a logic high voltage is stored in the memory cell 494. Thus, the acknowledge signal RACK(21) becomes a logic high voltage, while the remaining acknowledgment signals are a logic low voltage. These values are coupled to the data lines 102A via the logic OR gate 432 (FIG. 10) during a next bus-grant-for-IRQ command 05 H. Accordingly, in this example, port #21 obtains access to the bus 102, rather than port #2. Then, the logic high voltage from the memory cell 494 is transferred to the memory cell 474 for the next occurrence of the signal ENABLE1 becoming a logic high voltage. The other chain encoders 428, 430, 432 operate in a similar manner, though being enabled by the signals ENABLE2, ENABLE3 and ENABLE4, respectively, and each having an appropriate number of links.

An advantage of the logic circuits, including the interrupt/request decoder 402 (FIGS. 6–7), the port type decoder 406 (FIGS. 6, 9) and the priority chain encoder 404 (FIGS. 6, 10), utilized for determining which port is to be granted access to the bus 102 is that they determine which port is to be granted access to the communication bus 102 by providing the acknowledgements signals RACK(1–26) with a minimum of delay. Preferably, the acknowledgement signals RACK(1–26) are provided within the first cycle of the bus clock signal on the CLK bus line 102C (FIG. 4) which occurs after completion of the poll interrupt command 05 H or the poll request command 06 H. For example, because the chain encoder 424 (FIG. 11) includes 24 links, each link should have a delay that is less than 1/24 of the period of the bus clock signal.

Packet flow through the multi-port bridge 100 occurs in the following manner. A data packet, such as an IEEE 802.3 data packet, originating from a node (source node) in a segment of the local area network is received by a corresponding one of the ports 104–112 (source port) of the multi-port bridge 100 (FIG. 3). The receive buffer 316 in the source port receives the data packet as the packet is being received by the transceiver 308 in the source port from the network segment associated with the source port. After the first twelve bytes, corresponding to the source address and the destination address for the packet, are received by the source port, the receive finite state machine 312 requests a look-up cycle from the bus control module 114 (FIG. 3) by raising the interrupt IRQ line 102G. The bus control module 114 monitors such requests, discovers the requesting port(s) via the poll-interrupt command 05 H and grants each request according to an appropriate priority via the bus-grant-for IRQ command 14 H, as explained above.

Upon obtaining access to the bus, the source port places a look-up command 03 H (Table 1) on the control lines 102B. During successive clock cycles while the look-up command 03 H is active, an identification of the source port, the destination node address from the packet and the source node address from the packet are transferred from the source port to the look-up control module 120 (FIG. 3) via the data lines 102A. The source port identification, destination address and source address are transferred over the communication bus 102 in segments that are each four bytes long as this corresponds to the width (32 bits) of the data lines 102A of the communication bus 102. Preferably, this transfer is completed in four clock cycles. It will be apparent, however, that the communication bus 102 can have a different number of data lines, in which case, a different number of bytes can be transferred at a time.

Once the look-up control module 120 has received the source port identification, the destination address and the source address for the packet, the look-up control module 120 so notifies the memory control module 118 (FIG. 3). The memory control module 118 and look-up control module 120 then update the look-up tables 204 (FIG. 3) by ensuring that the source node address for the packet is stored in the look-up tables 204 in association with the source port identification for the packet. This ensures that the look-up tables 204 accurately reflect any changes that may have occurred in the network (this is referred to as a learning cycle). The information stored during the learning cycle is utilized for directing subsequent packets.

Once the learning cycle is complete, the memory control module 118 and the look-up control module 120 utilize the look-up tables 204 to determine which port (destination port) is associated with the destination address for the packet. If the packet is a multi-cast packet (multiple destination ports) or a broadcast packet (all ports except the source port are destination ports), the look-up control module 120 will determine which are the multiple destination ports for the packet. Once the look-up cycle is complete, the look-up control module 120 places a look-up ready command 08 H (Table 1) on the control lines 102B of the bus 102 and, while the look-up ready command 08 H is active, the look-up control module 120 raises the respective signal lines of the data lines 102A of all the ports 104–112 which are determined to be destination ports for the packet. One signal line each corresponds uniquely with one of the ports 104–112.

Figure 13:
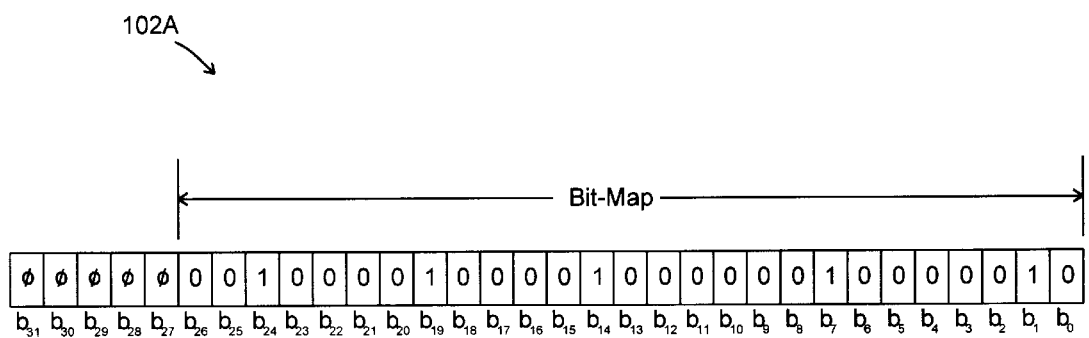
FIG. 13 illustrates a bit-map of the destination ports which appears on the high speed communication bus during a look-up ready command according to the present invention.

This raising of the respective signal lines is referred to as a bit-map of the destination ports. FIG. 13 illustrates logic levels for each of the thirty-two data lines 102A, of the bus 102 during the look-up ready command 08 H. Each one of the twenty-six ports 104–112 and the external processor 400 are assigned to a respective one of the signal lines $b_0$–$b_{31}$. Thus, for example, the external processor 400 is assigned to signal line $b_{26}$, while port #1 is assigned to signal line $b_0$, port #2 is assigned to signal line $b_1$, port #3 is assigned to signal line $b_2$, and so forth, with port #26 assigned to signal line $b_{25}$. In the preferred embodiment, signal lines $b_{27}$–$b_{31}$ are not included in the bit-map. Rather, the signal lines $b_{27}$–$b_{31}$ identify the source port. A multi-port bridge, however, could include more or fewer ports, in which case, the bit assignments would be different.

Assume that the look-up cycle for a packet having port #9 as its source port determines that the packet is multi-cast having destination nodes associated with destination ports #1, #7, #12, #19 and #24. Therefore, during the look-up ready command 08 H, the bit-map of the destination ports will include logic one's for signal lines $b_0$, $b_6$, $b_{11}$, $b_{18}$ and $b_{23}$; signal lines $b_{27}$–$b_{31}$ identify port #9 as the source port; and the remaining signal lines $b_1$–$b_5$, $b_7$, $b_9$–$b_{10}$, $b_{12}$–$b_{17}$, $b_{19}$–$b_{22}$ and $b_{24}$–$b_{26}$ are logic zeros.

Each port monitors the communication bus 102 for the look-up ready command 08 H appearing on the control lines 102B and the associated bit-map of the destination ports appearing on the data lines 102A. The bit-map allows each destination port for the packet to be simultaneously notified of its status as a destination port. If the source port for the packet is also designated as the only destination port for the packet during the look-up ready command 08 H, this indicates that the destination node for the packet is in the same network segment as the source node (intra-segment communication). As such, the source port should not retransmit the packet because the destination node would have already received the packet at the same time that the source port received the packet. When this occurs and the packet has a single destination, the packet is filtered. To filter the packet, the source port preferably takes no further action relative to the packet.

If any destination port having its signal line raised during the look-up ready command 08 H has a memory pointer buffer 306 that is full or nearly full, such destination port raises the JAM REQ line 102D (FIG. 4) while the look-up ready command 08 H is still active. During the look-up ready command 08 H, the source port monitors the JAM REQ line 102D for such a jam request. In response to a jam request, the source port discards the incoming packet and also sends a jam signal over its associated segment. The jam signal will cause the node (source node) which is the source of the packet to discontinue sending the packet and attempt to resend the packet after a waiting period.

Once the look-up ready command 08 H is no longer active, the source port for the packet places a bus-release command 0F H (Table 1) on the control lines 102B of the data bus 102. This releases control of the bus 102 by indicating to the bus control module 114 that the bus is available.

The bus control module 114 then responds to any pending interrupts or requests for access to the bus 102 by granting access to the bus according to an appropriate priority. Thus, while the packet is still being received by the source port, but after the determination is made whether to filter or jam the incoming packet, the bus 102 can be utilized for other purposes.

Meanwhile, returning the example, the packet continues being received by the source port. Once 64 bytes of the packet have been received, the source port requests access to the bus again, this time by raising the REQ line 102F. The bus control module 114 grants access to the source port according to an appropriate priority by placing a bus-grant-for-REQ command 04 H on the control lines 102B and raises the signal line corresponding to the source port.

The packet buffers 206 include a space allocated to each port for storing packets received by the port. Each port controller 300 keeps track of the space allocated to the port and determines a location in the packet buffers 206 for each packet received by the port. Preferably, the packets are written into the allocated space in a circular fashion; each new packet overwrites portions of the oldest packet in the allocated space.

The source port initiates a series of memory write cycles for loading the packet from the receive buffer 316 of the source port into the allocated space in the packet buffers 206 by first placing a new packet transfer command 10 H (Table 1) on the control lines 102B and by placing the source port identification and the bit-map for the destination ports on the data lines 102A (raising the signal lines corresponding to each destination port for the packet). If any destination port having its signal line raised during new packet transfer command 10 H is not currently busy transmitting or receiving another packet, such destination port configures itself to receive the packet directly from the source port (cut-through). Destination ports that are currently busy ignore the packet for now and retrieve the packet from the packet buffers 206 later, when they are no longer busy.

Following the new packet transfer command 10 H, the source port places a memory write command 02 H (Table 1) on the control lines 102B of the bus 102. During a first bus clock cycle while the memory write command 02 H is active, the source port places on the data lines 102A one byte of information which indicates the number of bus cycles which will be required to complete the entire transfer. The number of bus cycles depends upon how much of the packet was received in the source port while the source port awaited access to the bus 102. Also during the first bus clock cycle while the memory write command 02 H is active, the source port places on the data lines 102A three bytes of information which indicates a starting address within the packet buffers 206 for the memory write cycles. The memory control module 118 receives this information for performing the memory write operation.

Simultaneously with the writing of the packet into the memory buffers 206, each destination port configured for cut-through receives the packet directly from the bus 102 into its transmit FIFO 318 and immediately begins transmitting the packet to the appropriate destination node on its associated network segment under control of its transmit finite state machine 314. The destination node for the packet then begins to receive the packet from the network segment.

In subsequent bus clock cycles while the memory write command 02 H is active, the source port places the packet on the data lines 102A in four byte portions (corresponding to the width of the data lines 102A), one portion for each clock cycle, until the memory write operation is completed. Simultaneously, destination ports configured for cut-though continue to receive the packet and continue to transmit the packet to their associated network segment. When the memory write operation is completed, the source port releases the bus via the bus-release command 0F H.

Once the next 64 bytes of the packet is received by the source port, the source port again requests access to the bus 102 by raising the REQ line 102F and initiates a next memory write operation for loading the packet into the packet buffers 206. The source port first places a continuation packet transfer command 11 H (Table 1) on the control lines 102B and, while the continuation packet command 11 H is active, the source port places the bit-map for the destination ports on the data lines 102A (raises the signal lines corresponding to each destination port for the packet). Only those destination ports having their signal lines raised and that had already been receiving the packet directly from the source port (those destination ports configured for cut-through) will continue to receive the next installment of the packet directly from the source port. Other destination ports will continue to ignore the packet. This is true even if a destination port that was busy during the new packet transfer command 10 H has become available because such a port would not have obtained the first installment of the packet. Then, the source port places the memory write command 02 H on the data lines 102A and places one byte of information indicating the number of bus cycles required and three bytes indicating the starting address for this write operation. Then, the port releases the bus via the bus-release command 0F H. This process repeats, including requesting access to the bus and placing the continuation packet transfer command 10 H on the bus 102, for each successive 64 byte portion of the packet until the entire packet is loaded into the packet buffers 206. Because writing of the packet in the packet buffers 206 preferably occurs as the remainder of the packet is still being received into the receive buffer 316 of the source port, the receive buffer 316 for each port need not be capable of storing an entire data packet.

The packet is preferably loaded into the packet buffers 206 a predetermined offset from an assigned starting address. This provides a location for storing a header for the packet once the packet has been completely loaded into the packet buffers 206. For example, the header includes an identification number assigned to the packet, an indication of the destination ports for the packet, the receive status for the packet, the length of the packet, the source node address for the packet and the destination node address for the packet. The receive status indicates whether or not the entire packet has been successfully received and loaded into the packet buffers 206. Preferably, the header is eight bytes long, though it will be apparent that another length can be selected for the header.

After the last data is transferred such that the entire packet has been stored in the packer buffers 206, the source port retains control of the bus 102 and stores the header for the packet in the packet buffers 206. This is accomplished by the source port placing a packet header command 12 H on the control lines 102B. During a first clock cycle while the packet header command 12 H is active, the source port places one byte of information indicating the number bus clock cycles required to write the entire header into the memory buffers 206 and places three bytes of information indicating the assigned starting address for the packet. During successive bus clock cycles, the header is written into the packet buffers beginning at the assigned starting address.

Each port monitors the communication bus 102 for the packet header command 12 H. While the packet header command 12 H is active, each port receives the packet header information. Each port which is identified as a destination port in the packet header checks the receive status for the packet and, if the packet was successfully received and stored in the packet buffers 306, the destination port stores at least the assigned starting address for the packet in its memory pointer buffer 306. Preferably, the destination port also stores the identification number assigned to the packet in the memory pointer buffer 306 along with the assigned starting address for the packet. If the receive status indicates an error, however, the starting address in the packet buffers is not stored and no further action is taken by the destination ports relative the packet. Finally, the source port releases control of the bus 102 via the bus release command 0F H. This completes the actions taken by the source port relative the packet.

Each port monitors its memory pointer buffer 306 and initiates retrieval of packets from the packet buffers 206. Thus, returning to the example packet, as soon as the destination port becomes available, it removes the identification number for the packet and the assigned starting address for the packet from its memory pointer buffer 306. Then, the destination port requests access to the bus by raising the request REQ line 102F. Once the bus control module grants access to the bus 102, via the bus-grant-for-REQ command 04 H, the destination port first retrieves the header for the packet from the packet buffers 206. Thus, the destination port initiates a read operation by placing a memory read command 01 H (Table 1) on the control lines 102B of the bus 102. During a first clock cycle while the memory read command 01 H is active, the destination port places on the data lines 102A of the bus 102 one byte of information indicating the number of bus clock cycles for the read operation (e.g. the number of transfers required to retrieved the header) and three bytes of information indicating the assigned starting address for the packet.

Once the packet header is retrieved from the packet buffers 206, the destination port checks the packet identification number that is included in the header retrieved. If the packet identification number retrieved from the packet buffers 206 does not match the packet identification number stored in the memory pointer buffer 306, this indicates that the packet became corrupted in the packet buffers 306 after it was stored. For example, if a portion of the packet was overwritten by a later packet, the identification number will also be overwritten, such that it does not match the identification number stored in the memory pointer buffer 306 of the destination port. In addition, the destination port obtains the length of the packet so that it can determine the appropriate number of memory read cycles that will be required to transfer the entire packet.

While the destination port is retrieving the packet from the packet buffers 206, the destination port simultaneously transmits the packet to its associated segment under control of the transmit finite state machine 314. For this reason, the transmit FIFO 318 in each port need not be capable of storing more than a single packet of the maximum length. Preferably, the packet is retrieved from the packet buffers 206 in multiple installments until the entire packet has be retrieved from the packet buffers 206. An installment is initiated each time the transmit FIFO 318 is nearly empty. Each installment is retrieved by the destination port obtaining access to the bus 102; placing a memory read command 01 H on the bus 102 while specifying a number of memory transfers required for the installment; and releasing the bus via the bus release command 0F H after performing the specified number of transfers. Accordingly, the transmit FIFO 318 preferably need not be capable of storing a packet of maximum length. Because the bus 102 is released between installments, other ports can access the bus for other purposes simultaneously with the destination port transmitting the packet to its associated network segment.

In the event that a cut-through or transmit operation was initiated, but was unsuccessful, the packet will need to be retransmitted by the destination port. For example, the cut-through or transmit operation may have been unsuccessful if a data collision occurred during transmission of the packet over the segment associated with the destination port. In such case, the packet is retrieved from the packet buffers 206 as described above and re-transmitted by the destination port.

While the destination port is receiving the packet into its transmit buffer 318 from the packet buffers 206, the destination port begins transmitting the packet to the LAN segment associated with the destination port. The packet is then received from the network segment by the destination node for the packet.

Thus, if the destination port is configured for cut-through, the destination port will receive the packet into its transmit buffer 318 directly from the communication bus 102 simultaneously with the write cycles for loading of the packet into the packet buffers 206. During such a cut-through operation, the packet is received into a transmit buffer 318 of the destination port for immediate transmission to the LAN segment associated with the destination port. If the packet is a broadcast or multi-cast packet, one or more of the destination ports can receive the packet directly from the source port, while one or more other destination ports for the packet can retrieve the packet from the packet buffers 206 once those destination ports are no longer busy.

Figure 14:
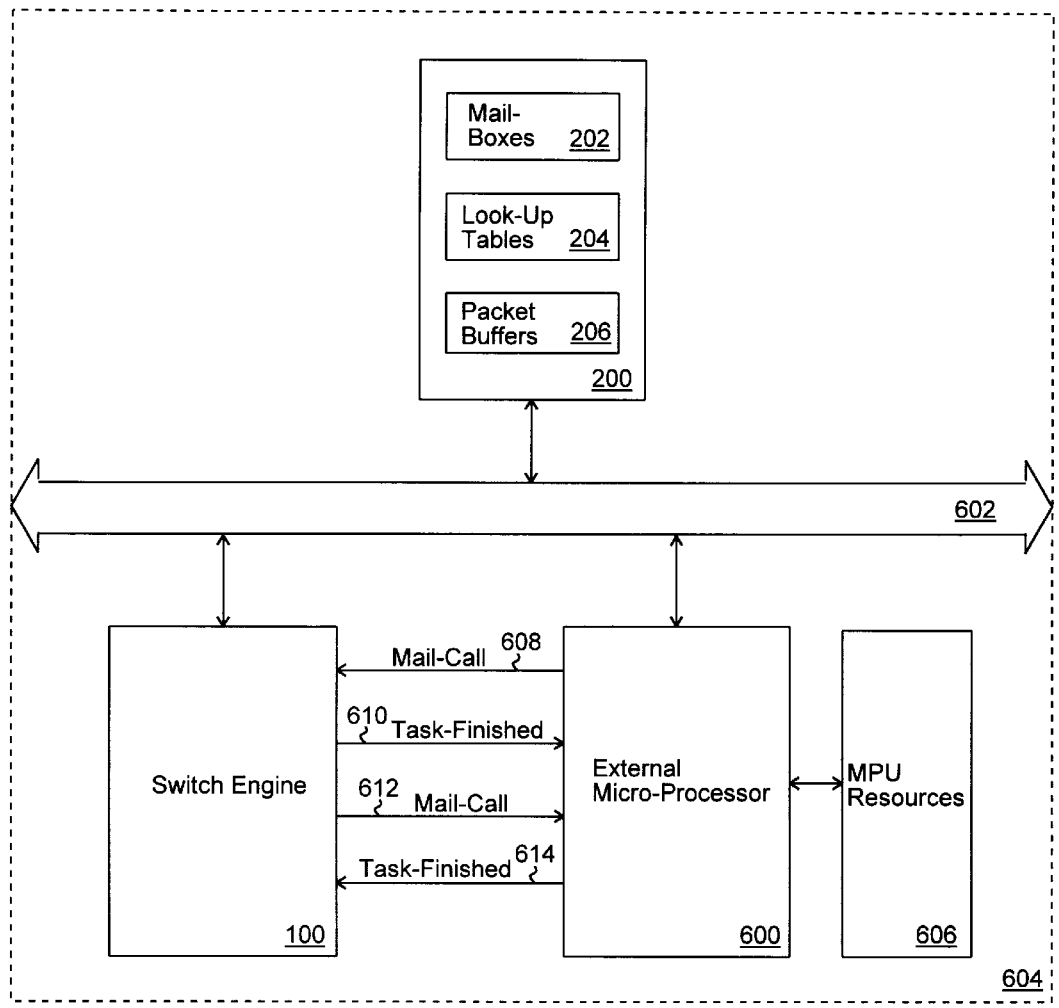
FIG. 14 illustrates a block schematic diagram of the switch engine, a memory device and an external processor according to the present invention.

FIG. 14 illustrates a block schematic diagram of the multi-port bridge 100, the memory device 200 and an external processor 600 according to the present invention. A memory bus 602 interconnects the multi-port bridge 100 and the external processor 600 to the memory device 200. Preferably, access to the memory device 200 by the multi-port bridge 100 and the external processor 600 is implemented by a multiplexor included as part of the memory bus 602 and which multiplexor is controlled by the multi-port bridge 100. The multi-port bridge 100, including the communication bus 102 (FIGS. 3–4), is preferably implemented as an integrated circuit mounted to a printed circuit board 604. The memory device 200 and the external processor 600 are also mounted to the printed circuit board 604.

As described above, the bridging and filtering functions of the multi-port bridge are performed primarily by the multi-port bridge 100 and the buffer memory 200. Because the multi-port bridge 100 is preferably implemented as a number of finite state machines interconnected via the communication bus 102, the multi-port bridge 100 provides a high bandwidth capacity for directing data packets through the multi-port bridge. Thus, according to the present invention, the external processor 600 is provided to perform tasks in support of the functioning of the multi-port bridge 100. These functions include: providing a communication port for enabling the nodes of the LAN to communicate with nodes of a dissimilar LAN or a WAN and for enabling the nodes of the LAN to communicate with a file server for the LAN; providing parameters for initializing registers of the switch engine via a register load command 0C (Table 1); collecting data from the LAN for performing network management functions via a register read command 0D (Table 1); and providing services to the multi-port bridge 100. The mailbox interface according to the present invention allows the external processor 600 to provide these functions without the need to dedicate a large number of pins of the integrated circuit package to such an interface.

Preferably, the external processor 600 is implemented as a reduced instruction set computer (RISC) to improve speed performance. The external processor 600 can have its own dedicated resources 606, such as memory for storing operating software for the external processor 600 and for use by the external processor 600 as a scratch pad. In addition, when the external processor 600 performs the functions of a file server for the LAN, the resources 606 can include a mass storage device for storing application programs and data files which is accessible by the external processor 600. Also, when the external processor 600 performs the function of providing an interconnection of the LAN to a dissimilar LAN or to a WAN, the resources 606 can include a communication device, such as a telephone modem, an integrated services digital network (ISDN) interface, a T1 media interface or a T3 media interface which is accessible by the external processor 600. In addition, multiple external processors 600 can be coupled to the memory bus 602. In such case, additional resources can be provided for such multiple external processors, such as one or more mass storage devices and/or one or more communication devices.

When a packet is originated by the external processor 600, the destination address and source address for the packet are placed in the memory 200 by the external processor 600. For this purpose, the external processor obtains access to the bus 102. For this purpose, the external processor 600 accesses the bus 102, though the external processor 600 is granted access to the bus 102 according to a priority that is lower than accesses initiated by the ports #1–26 104–112 (FIG. 3). Rather than obtaining the destination and source addresses from the source port, the destination and source addresses are obtained from the memory 200. The memory control module 118 places a look-up gated with MEMRDY command 09 H on the control lines 102B of the bus 102, retrieves the destination address and source address from the memory 200, and places them on the data lines 102A. As with the look-up command 03 H, transfer of the destination and source addresses is performed over several bus clock cycles. The look-up control module 120 responds to the look-up gated with MEMRDY command 09 H by waiting until the MEMRDY line 102E is raised to a logic high voltage level before beginning to receive the destination and source addresses for performing a look-up cycle. This ensures that the destination and source addresses appearing on the data lines 102A are valid before the look-up control module 120 receives them.

Figure 15:
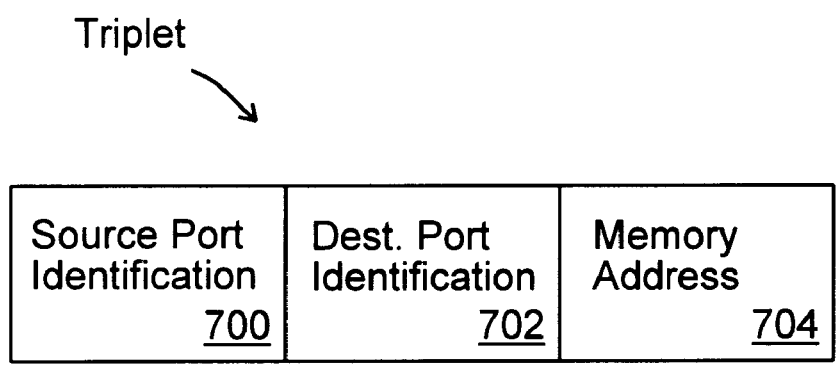
FIG. 15 illustrates a "triplet" according to the present invention, including a first field containing an identification of a source port, a second field containing an identification of a destination port, and a third field containing a memory address.

In an alternate embodiment, the memory pointer buffer 306 of each port stores memory pointers, referred to as "triplets" for data packets being queued in the packet buffers 206 of the DRAM memory 200, rather than the memory pointers described above (having a packet identification number and memory starting address). FIG. 15 illustrates a "triplet" according to the present invention. Each triplet includes three fields: a first field 700 containing the identification of the source port, a second field 702 containing the identification of the destination port, and a third field 704 containing a starting address assigned to the incoming packet in the packet buffers 206.

As before, while a packet is being received by the source port, a look-up cycle is initiated by the source port to identify which is the appropriate destination port for the packet based upon the destination address. A result of performing the look-up for each packet, however, is a triplet. The starting address contained in the triplet is assigned by the memory control module 118. While the packet is being received by the source port, the memory control module 118 places an "initial" triplet on the data lines 102A of the communication bus 102 and places a corresponding initial triplet command on the control lines 102B. This is in contrast to placing the bit-map of the destination ports on the data lines 102A and placing the associated the look-up ready command 08 H on the control lines 102B, as described above. The initial triplet is received by each port. If the source port and the destination port are the same, this indicates that the source and destination nodes are on the same segment of the LAN (intra-segment communication). The source port recognizes this condition and, in response, filters the packet.

If the port identified as the destination port in the triplet is not currently busy transmitting or receiving another packet, the destination port configures itself to receive the packet directly from the source port (cut-through). However, if the memory pointer buffer 306 in the port identified as the destination port in the triplet is nearly full, the bus controller 300 of the destination port raises the JAM REQ line 102D. The source port receives the jam request and, in response, discards the incoming packet and also sends a jam signal over its associated segment. The jam signal causes the node (source node) which is the source of the packet to discontinue sending the packet and attempt to resend the packet after a waiting period.

The packet is loaded from the receive buffer of the source port into the packet buffers 206 starting at the memory address identified by the third field of the triplet. As before, a predetermined offset provides a space for storing header information for the packet. Writing of the packet into the packet buffers 206 preferably occurs as the remainder of the packet is still being received into the receive buffer of the source port. For this reason, the receive buffer 316 for each port need not be capable of storing the entire data packet. In addition, if the destination port is configured for cut-through, the destination port will receive the packet into its transmit buffer 318 directly from the communication bus 102 simultaneously with the write cycles for loading of the packet into the packet buffers 206. During such a cut-through operation, the packet is received into the transmit buffer 318 of the destination port and immediately transmitted to the LAN segment associated with the destination port.

Once the entire packet has been loaded into the packet buffers, the memory control module 118 places a "final" triplet on the data lines 102A of the communication bus 102 and places a corresponding final triplet command on the control lines 102B. It should be noted that the bit patterns for the initial triplet and for the final triplet are preferably identical, while the bit patterns placed on the command lines of the communication bus 102 for identifying each of the initial and final triplets are distinct. The destination port receives the final triplet and stores it in its memory pointer buffer 306. This is in contrast to placing the packet identification and assigned starting address in the memory pointer buffer, as described above. Thus, the packet is queued for transmission by the destination port.

Then, when the destination port is no longer busy, the destination port retrieves the packet from the packet buffers 206 by gaining access to the communication bus 102 and initiates a series of read operations over the communication bus 102 beginning at the starting address in the packet buffers 206 of the packet (from the third field of the triplet for the packet).

In both embodiments, the memory pointers stored in the memory pointer buffer 306 of each port are preferably of a uniform size. Therefore, the exact number of memory pointers that can be accommodated by a memory pointer buffer 306 of a port can be determined from the amount of space available in the memory pointer buffer 306 of the port. Accordingly, unlike prior arrangements, extra space does need to be provided in the port to accommodate a data packet having an unknown length. According to the present invention, however, the jam request (raising the JAM REQ line 102D) is preferably generated by a destination port for a packet when the memory pointer buffer 306 in the port is nearly full, but has space available to store several memory pointers (e.g. ten). This provides the destination port an ability to store memory pointers for packets which are in the process of being loaded into the packet buffers 206. The memory pointer buffer 306 in each port is preferably sized relative to the associated packet buffers 206 in the memory device 200 such that there is only a small possibility that the packet buffers 206 will become full before any memory pointer buffer 306 becomes full. For example, because each port can hold up to 128 memory pointers, the packet buffers 206 can preferably accommodate 128 data packets of the maximum size for each port. In practice, the packet buffers 206 can be somewhat smaller because not every packet is expected to have the maximum size.

The present invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications can be made in the embodiment chosen for illustration without departing from the spirit and scope of the invention. Specifically, it will be apparent to one of ordinary skill in the art that the device of the present invention could be implemented in several different ways and the apparatus disclosed above is only illustrative of the preferred embodiment of the invention and is in no way a limitation.

What is claimed is:

1. An apparatus for granting access to a communication bus, the communication bus for interconnecting a plurality of ports in a multi-port bridge for a local area network, the apparatus comprising:
   a. a first plurality of signal lines, one signal line for each port of a first plurality of ports wherein a logic level applied to the signal line for each port of the first plurality is indicative of whether the corresponding port is attempting access to the communication bus; and
   b. a first chain circuit coupled to the first plurality of signal lines for determining which of the first plurality of ports is to be granted access to the communication bus, wherein the first chain circuit comprises a first plurality of links, one link for each of the first plurality of ports, wherein each link is selectively configured for passing a first logic signal to a next link according to the logic level of the signal line of the port corresponding to the link.

2. The apparatus according to claim 1 wherein the first chain circuit is coupled to receive a first enable signal and wherein the first logic signal originates in response to the first enable signal.

3. The apparatus according to claim 2 wherein the first enable signal is formed in response to one or more of the first plurality of ports attempting a first type of access to the communication bus.

4. The apparatus according to claim 3 further comprising a second chain circuit coupled to the first plurality of signal lines for determining which of the first plurality of ports is to be granted access to the communication bus, wherein the second chain circuit comprises a second plurality of links, one link for each of the first plurality of ports, wherein each link is selectively configured for passing a second logic signal to a next link according to the logic level of the signal line of the port corresponding to the link.

5. The apparatus according to claim 4 wherein the second chain circuit is coupled to receive a second enable signal and wherein the second logic signal originates in response to the second enable signal.

6. The apparatus according to claim 5 wherein the second enable signal is formed in response to one or more of the second plurality of ports attempting a second type of access to the communication bus.

7. The apparatus according to claim 6 wherein the first and second type of access to the communication bus each have a relative priority for access the communication bus.

8. The apparatus according to claim 6 wherein the first chain circuit forms a first output signal for each port of the first plurality and wherein the second chain circuit forms a second output for each port of the first plurality and wherein the first output signal and the second output signal for each port are combined according to a logic OR function.

9. The apparatus according to claim 2 further comprising:
   a. a second plurality of signal lines, one signal line for each port of a second plurality of ports wherein a logic level applied to the signal line for each port of the second plurality is indicative of whether the corresponding port is attempting access to the communication bus; and
   b. a second chain circuit coupled to the second plurality of signal lines for determining which of the second plurality of ports is to be granted access to the communication bus, wherein the second chain circuit comprises a second plurality of links, one link for each of the second plurality of ports, wherein each link is selectively configured for passing a second logic signal to a next link according to the logic level of the signal line of the port corresponding to the link.

10. The apparatus according to claim 9 wherein the second chain circuit is coupled to receive a second enable signal and wherein the second logic signal originates in response to the second enable signal.

11. The apparatus according to claim 10 wherein the first enable signal is formed in response to one or more of the first plurality of ports attempting to access the communication bus and wherein the second enable signal is formed in response to one or more of the second plurality of ports attempting to access the communication bus.

12. The apparatus according to claim 11 wherein the first plurality of ports and second plurality of ports each have a relative priority for accessing the communication bus.

13. The apparatus according to claim 11 wherein the first chain circuit forms a first output signal for each port of the first plurality and wherein the second chain circuit forms a second output for each port of the second plurality.

14. The apparatus according to claim 1 wherein the first plurality of links are coupled to form a loop.

15. The apparatus according to claim 1 wherein the first logic signal originates in a link adjacent to a link corresponding to a port of the first plurality last granted access to the communication bus.

16. An apparatus for granting access to a communication bus, the communication bus for interconnecting a plurality of ports in a multi-port bridge for a local area network, the apparatus comprising:
   a. a plurality of signal lines, one signal line for each port of the plurality;

b. a first circuit coupled to each of the plurality of ports for determining a type of access to the communication bus;

c. a second circuit coupled to each of the signal lines for determining a type of port attempting access to the communication bus; and d. a third circuit coupled to the first circuit and to the second circuit for determining which of the plurality of ports is to be granted access to the communication bus, wherein ports of a like type which attempt a like type of access to the communication bus are granted access to the communication bus according to an assigned relative order wherein a port last granted access to the communication bus has a lowest priority and a port adjacent in the assigned relative order to the last port granted access to the communication bus has a highest priority and remaining ports have ascending intermediate levels of priority according to the assigned relative order.

17. The apparatus according to claim 16 wherein the first circuit comprises a first logic AND gate having a first input, a second input and an output wherein the first input is coupled to receive a first signal representative of whether any of the plurality of ports is attempting a first type of access and the second input is coupled to receive a signal representative of whether any of the plurality of ports is attempting a second type of access.

18. The apparatus according to claim 17 wherein the second circuit comprises a second logic AND gate having a first input, a second input and an output wherein the first input is coupled to receive a signal representative of whether any of a first type of port of the plurality of ports is attempting to access the communication bus and the second input is coupled to receive a signal representative of whether any of a second type of port of the plurality of ports is attempting to access the communication bus.

19. The apparatus according to claim 18 wherein the third circuit comprises:

a. a first logic circuit coupled to the output of the first logic AND gate and coupled to the output of the second logic AND gate, the first logic circuit for forming a plurality of enable signals; and b. a plurality of chain encoder circuits coupled to the first logic circuit and to the plurality of signal lines, one chain encoder circuit for each enable signal, and each chain encoder circuit having a plurality of links, one link for each port serviced by the chain encoder circuit, wherein each link of each chain encoder circuit is selectively configured for passing a logic signal to a next link according to a logic level of the signal line of the port corresponding to the link.

20. The apparatus according to claim 16 wherein the second circuit comprises a second logic AND gate having a first input, a second input and an output wherein the first input is coupled to receive a signal representative of whether any of a first type of port of the plurality of ports is attempting to access the communication bus and the second input is coupled to receive a signal representative of whether any of a second type of port of the plurality of ports is attempting to access the communication bus.

21. The apparatus according to claim 16 wherein a logic level applied to the signal line for each port is indicative of whether the corresponding port is attempting access to the communication bus.

22. The apparatus according to claim 21 wherein the third circuit is coupled to receive the logic level applied to the signal line for each port and further wherein the third circuit determines which port of the plurality is to be granted access to the bus within a single cycle of a bus clock after the third circuit receives each logic level.

23. The apparatus according to claim 16 wherein the assigned relative order repeats.

24. The apparatus according to claim 16 wherein the communication bus comprises the signal lines.

25. The apparatus according to claim 16 wherein the type of port is selected according a rate which the port transmits and receives data.

26. The apparatus according to claim 16 wherein the type of attempt is selected from a look-up operation for determining a destination for an incoming packet and a memory transfer operation for transferring a packet between a memory device and a port of the plurality.

27. A method of granting access to a communication bus, the communication bus for interconnecting a plurality of ports in a multi-port bridge for a local area network, the method comprising steps of:

a. receiving one or more attempts for access to the communication bus from one or more of the ports wherein each attempt is one of a plurality of different types of attempts and each port is one of a plurality of different types of ports;

b. determining which of the plurality of ports is to be granted access to the communication bus, wherein each type of attempt has a relative priority and each type of port has a relative priority, wherein ports of a like type which attempt a like type of access to the communication bus are granted access to the communication bus according to an assigned relative order, wherein a port last granted access to the communication bus has a lowest priority and a port adjacent in the assigned relative order to the last port granted access to the communication bus has a highest priority and remaining ports have ascending intermediate levels of priority according to the assigned relative order.

28. The method according to claim 27 wherein the type of attempt is selected from a look-up operation for determining a destination for an incoming packet and a memory transfer operation for transferring a packet between a memory device and a port of the plurality.

29. The method according to claim 28 wherein a memory pointer for the packet is stored in the port.

30. The method according to claim 27 wherein the assigned relative order repeats.

31. The method according to claim 27 wherein the type of port is selected according a rate which the port transmits and receives data.

32. An apparatus for granting access to a communication bus, the communication bus for interconnecting a plurality of ports in a multi-port bridge for a local area network, the apparatus comprising:

a. means for collecting the plurality of ports into a plurality of groups of ports, wherein each group of ports has a predetermined relative group priority and the ports within each group of ports have a predetermined relative port order;

b. means for determining whether any one of the ports is requesting access to the communication bus;

c. means for determining a highest current group from among the groups of ports having a port requesting access to the communication bus according to the predetermined relative group priority;

d. means for determining when there is more than one port in the highest current group which is requesting access to the communication bus; and e. means for granting access to an accessing requesting port of the highest current group according to the predetermined relative port order, wherein a port last granted access to the communication bus is a last port within the relative port order of the highest current group.

33. The apparatus according to claim 32 wherein a port adjacent in the predetermined relative port order to the last port granted access to the communication bus is a first port within the relative port order and remaining ports are intermediate ports according to the predetermined relative port order.

34. The apparatus according to claim 32 further comprising means for sequentially granting access to remaining access requesting ports within the highest current group according to the predetermined relative port order when more than one port of the highest current group is requesting access to the communications bus.

35. The apparatus according to claim 32 further comprising:
  a. means for determining a type of each request from among a plurality of types of requests wherein each of the plurality of types of requests has a predetermined relative request priority; and
  b. means for determining a highest current type of request from the plurality of types of requests according to the predetermined relative request priority;

wherein the means for determining the highest current group further comprises means for determining the highest current group from among the groups of ports having one or more ports requesting the highest current type of request and further wherein the access requesting port of the highest current group further comprises one of the ports requesting the highest current type of request.

* * * * *

UNITED STATES PATENT AND TRADEMARK OFFICE
CERTIFICATE OF CORRECTION

PATENT NO.   : 6,157,951
DATED        : December 5, 2000
INVENTOR(S)  : Suresh L. Vasa It is certified that error appears in the above-identified patent and that said Letters Patent is hereby corrected as shown below:

Title page,
REFERENCES CITED ITEM [56]

The following Other Publications need to be added:

-- William Stallings, "Internetworking: A Guide for the Perplexed," Telecommunications, North American Edition, Sept. 1989, pp. 25-30. Hemant Kanakia and David R. Cheriton, "The VMP Network Adapter Board (NAB): High-Performance Network Communication for Multiprocessors," Computer Communications Review, vol. 18, no. 4, pp. 175-187, 1988. --

Signed and Sealed this

Twenty-third Day of October, 2001

Attest:

NICHOLAS P. GODICI
Attesting Officer   Acting Director of the United States Patent and Trademark Office